United States Patent [19]

Hayashi et al.

[11] Patent Number: 5,740,918

[45] Date of Patent: Apr. 21, 1998

[54] APPARATUS AND METHOD FOR DENSITY SEPARATION OF PLASTICS

[75] Inventors: Masakatsu Hayashi, Ushiku; Yoshiyuki Takamura, Kudamatsu; Tsutomu Hasegawa, Niiza; Hideharu Mori; Tatsuji Katoh, both of Tokyo, all of Japan

[73] Assignee: Hitachi, Ltd., Tokyo, Japan

[21] Appl. No.: 534,710

[22] Filed: Sep. 27, 1995

Related U.S. Application Data

[62] Division of Ser. No. 453,062, May 26, 1995, Pat. No. 5,611,493, which is a continuation of Ser. No. 85,092, Jul. 2, 1993, Pat. No. 5,431,347, which is a continuation-in-part of Ser. No. 56,937, May 5, 1993, Pat. No. 5,301,881, which is a continuation of Ser. No. 984,492, Dec. 2, 1992, abandoned.

[30] Foreign Application Priority Data

Dec. 2, 1991 [JP] Japan ..................... 3-317643
Jan. 29, 1993 [JP] Japan ..................... 5-013385

[51] Int. Cl.$^6$ ..................................... B03B 5/60
[52] U.S. Cl. ................................. 209/173; 209/930
[58] Field of Search ........................ 209/132, 155, 209/162, 172, 172.5, 173, 930; 366/262, 325.1

[56] References Cited

U.S. PATENT DOCUMENTS

| 3,998,728 | 12/1976 | Strauss | 209/172.5 |
| 4,225,424 | 9/1980 | Patzlaff | 209/173 X |
| 4,759,841 | 7/1988 | Flodin | 209/173 X |

FOREIGN PATENT DOCUMENTS

| 3210972 | 10/1983 | Germany | 209/173 |
| 6063943 | 3/1994 | Japan | 209/173 |
| 6226743 | 8/1994 | Japan | 209/173 |

*Primary Examiner*—Tuan Nguyen
*Attorney, Agent, or Firm*—Antonelli, Terry, Stout, & Kraus, LLP

[57] ABSTRACT

An apparatus for sorting plastic pieces by specific gravity sorting includes a vessel containing water and having an inlet for plastic pieces to be sorted, a device for introducing plastic pieces to be sorted into the vessel through the inlet, a device for removing air bubbles from the plastic pieces within the water, and a device for moving the plastic pieces within the water in the vessel to allow the various plastic pieces to be sorted within the water due to the different specific gravities of the plastic pieces. A method of sorting plastic pieces by specific gravity sorting with the apparatus is also described.

7 Claims, 29 Drawing Sheets

F I G. 30
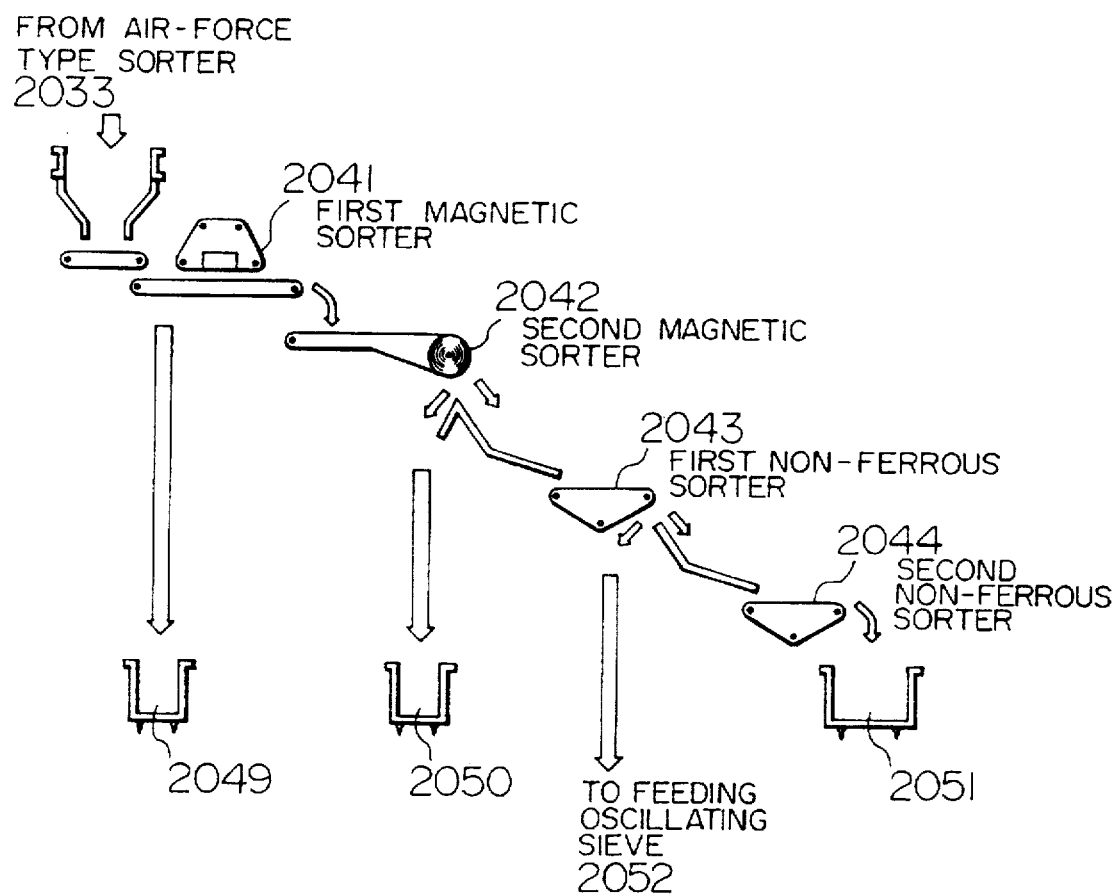

APPARATUS AND METHOD FOR DENSITY SEPARATION OF PLASTICS

CROSS-REFERENCE TO RELATED APPLICATION

This application is a Divisional application of application Ser. No. 453,062, filed May 26, 1995, (now U.S. Pat. No. 5,611,493) which application is a Continuation application of application Ser. No. 085,092, filed Jul. 2, 1993, (now U.S. Pat. No. 5,431,347) which application is a continuation-in-part application of application Ser. No. 056,937, filed May 5, 1993 (now U.S. Pat. No. 5,301,881), which application is a continuation application of application Ser. No. 984,492, filed Dec. 2, 1992 (now abandoned).

BACKGROUND OF THE INVENTION

1. Field of the Invention

The present invention relates to system for and method of disposing waste articles and, more particularly, to system for and method of crushing wasted articles such as household electric machines and collecting valuable matters and harmful matters separately.

2. Description of the Related Art

Hitherto, large-size waste articles are used for reclaiming purpose as they are or after suitable treatment such as crushing or burning. Reclamation without any treatment is inconvenient from the viewpoint of efficient use of restricted land area, while burning of such waste articles poses a problem of "warming" of the earth due to generation of carbon dioxide. Furthermore, waste articles are generally rich in vinyl chloride type plastics which, when burnt, generate noxious gases such as chlorine gas and chloride gases. Such gases undesirably damage the furnace in which the waste articles are burnt, resulting in shortened life of the furnace. Furthermore, such gases seriously impair environmental conditions when relieved to the atmospheric air. It is therefore necessary to employ a suitable means which would prevent such gases from being relieved into the air.

Recovery or collection of metals from waste articles rich in metal is broadly conducted as disclosed in Japanese Unexamined Patent Publication No. 50-156754, but no proposal has been made as to collection of the residue, i.e., the matters left after the removal of the metals. Such residue is usually used for reclaiming purpose with or without treatment such as burning, thus posing the aforesaid problems. Methods have been proposed in Japanese Unexamined Patent Publication Nos. 50-108765 and 50-81967 for sorting waste articles, but these proposed methods are directed mainly to sorting metals out of other components. Thus, plastics are handled together with paper and other matters, without being sorted out of other matters.

A simple method for sorting plastics makes use of difference in specific gravity, as disclosed in Japanese Unexamined Patent Publication Nos. 52-151371 and 58-205552. The methods disclosed in these publications are effective when different components of the waste have different values of specific gravity but are ineffective when different components have similar values of specific gravity as are the cases of different types of plastics having similar specific gravity values.

Another sorting method relies upon the difference in melting points. This type of method is considered to be effective in disposing foamed articles made of thermoplastic materials. However, noxious gases are generated during melting when the plastics include vinyl chloride type plastics, resulting in the problems such as damaging of the apparatus and destruction of environmental conditions.

Thus, the known disposing method in which large-size waste articles are used for reclaiming purpose after a volume reduction through crushing and burning poses problems such as warming of the earth due to generation of carbon dioxide and serious damaging of burning furnaces particularly when vinyl chloride type plastics are included.

The method of the type disclosed in Japanese Unexamined Patent Publication No. 50-156754, in which metals are collected and the residues are used for reclamation, cannot satisfactorily meet the demand for efficient use of restricted land area because this method cannot provide sufficient volume reducing effect.

The methods disclosed in Japanese Unexamined Patent Publication Nos. 52-151371 and 58-205552 cannot provide satisfactory sorting effect when the waste contain different components of similar specific gravity values. Sorting according to the specific gravity is not suitable when the waste includes any component which varies specific gravity according to the state, e.g., foamed articles.

Sorting according to difference in melting temperature is rather unsuitable for use in disposal of general waste articles which often contain vinyl chloride type plastics, since such plastics generate noxious gases during melting, resulting in problems such as damaging of the disposal apparatus and destruction of environmental conditions. Furthermore, this method cannot be used in disposing articles formed from thermosetting plastics because such plastics are never decomposed by heating.

Flons (freons) have been broadly used as a foaming agent for forming foamed articles. The use of flon is quite a common practice in the production of foamed thermal insulators because this foaming agent provides high thermal insulation effect. Nowadays, however, the use of flon type foaming agents is strictly limited by regulations in order to preserve ozone layer around the earth. Preservation of ozone layer requires not only limitation in the use of flon type foaming agents but also collection and disposal of flon type foaming agents which have already been confined in foamed articles to be wasted. Known disposal method poses a problem that the flon trapped in foamed articles as the foaming agent is undesirably relieved to the atmospheric air.

SUMMARY OF THE INVENTION

Accordingly, an object of the present invention is to provide waste disposal system and method which can collect and recover almost the whole parts of waste for the purposes of further use and preservation of natural resources available on the earth.

Another object of the present invention is to provide waste disposal system and method which can effectively collect flon to prevent scattering of flon, thereby preventing breakage of ozone layer which may otherwise be caused by relief of flon into the atmospheric air.

According to one feature of the present invention, there is provided a method of disposing waste articles of the kind that comprises metal bulk and other components including foamed material. The method includes the steps of:

separating the metal bulk from the other components of the waste articles;

cooling the thus separated metal bulk and crushing the thus cooled metal bulk by cryogenic crushing;

crushing the other components of the waste articles into fragments;

separating the fragments obtained by the crushing step into fragments of foamed material and other waste;

crushing the fragments of the foamed material;

separating the thus crushed fragments of the foamed material into plastics and a gaseous foaming agent; and liquefying the gaseous foaming agent by cooling and then collecting the thus liquefied foaming agent.

The present invention also provides a waste article disposing system operable to carry out the waste article disposing method pointed out in the preceding paragraph.

According to another feature of the present invention, there is provided a system for disposing waste articles of the kind that comprises metal bulk and other components including plastic materials. The system comprises:

means for crushing the waste articles into fragments;

means for sorting the thus crushed fragments into those of metals and plastic materials; and plastic sorting means for sorting the fragments of the plastic materials.

The plastic sorting means includes:

a first sorter operative to sort the plastic fragments into at least first and second kinds of fragments, the first kind comprising plastic fragments of sizes larger than the sizes of the plastic fragments of the second kind;

cooling device for cooling the plastic fragments of the first kind;

a crusher for crushing the thus cooled plastic fragments by making use of cold embrittlement of the plastic materials into plastic pieces;

a second sorter operative to sort the thus crushed plastic pieces into at least first and second classes, the first class comprising plastic pieces of sizes larger than the sizes of plastic pieces of the second class; and a specific gravity sorter operative to receive the second kind of plastic fragments from the first sorter and the second class of plastic pieces from the second sorter and sort the plastic fragments and pieces by differences of the specific gravities of the plastic materials.

According to a further feature of the present invention, there is provided a method of disposing waste machines. The method prises the steps of:

sorting said waste articles into first, second and third types, the first type of waste articles comprising those including metallic elements containing refrigerant and plastic elements of a foamed plastic material containing foaming agent, the second type of waste articles comprising those including elements of glass secured to other components, the third type of waste articles comprising those having elements made substantially of metals;

feeding the first type of waste articles to a refrigerant collecting means;

feeding the second type of waste articles to a large-size glass separation means;

the refrigerant collecting means being operative to extract and collect refrigerant from the metallic elements containing the refrigerant;

the large-size glass separation means being operative to separate large-size glass elements from the other components;

transferring to a metal bulk separation means the first type of waste articles from which the refrigerant has been extracted;

transferring to the metal bulk separation means the second type of waste articles from which the large-size glass elements have been separated;

feeding the third type of waste articles to the metal bulk separation means;

the metal bulk separation means being operative to separate metal bulks of the first, second and third types of waste articles from the other waste components of the waste articles;

crushing the metal bulks and the other waste components into fragments and separating fragments of light-weight materials from the other waste fragments;

collecting the foaming agent from the fragments of the light-weight materials; and sorting the other waste fragments into metallic fragments and plastic fragments.

The present invention also provides a waste machine disposing system operable to carry out the method pointed out in the preceding paragraph.

According to a still further feature of the present invention, there is provided a method of disposing waste articles of the kind that comprises metal bulks and other components. The method includes the steps of:

separating the metal bulks from the other components of the waste articles;

cooling the thus separated metal bulks to a temperature at which the metal bulks can be crushed by cryogenic crushing;

crushing the other components of the waste articles into fragments; and conducting a further crushing of the fragments obtained from the other components of the waste articles together with the cooled metal bulks.

The present invention also provides a waste article disposing system for carrying out the method pointed out in the preceding paragraph.

According to a still further feature of the invention, there is provided a method of disposing waste machines of the kind that comprises metal bulks and other components including metallic elements containing refrigerant therein and elements of light-weight materials including foamed material containing foaming agent therein. The method includes the steps of:

extracting the refrigerant from the metallic elements and collecting the thus extracted refrigerant;

separating the metal bulks from the other components;

crushing the other components into fragments of metals and light-weight materials;

separating the fragments of the light-weight materials from the fragments of metals; and separating the foaming agent from the fragments of the light-weight materials and collecting the thus separated foaming agent.

The present invention further provides a waste machine disposing system operable to carry out the method pointed out in the preceding paragraph.

According to a still further feature of the present invention, there is provided a method of disposing waste articles of the type that comprises metal bulks and other components. The method comprises the steps of:

separating the metal bulks from the other components;

crushing the metal bulks by cryogenic crushing into fragments of metals;

crushing the other components into fragments; and sorting the fragments obtained by the metal bulk crushing step and the fragments obtained by the other component crushing step into ferrous fragments and non-ferrous fragments.

The present invention further provides a waste article disposing system operable to carry out the method pointed out in the preceding paragraph.

According to a still further feature of the present invention, there is provided a method of disposing waste articles of the kind that comprises metal bulks and other components including plastic material. The method comprises the steps of:

crushing the waste articles into fragments;

sorting the thus crushed fragments into those of metals and plastic materials; and further sorting the fragments of the plastic materials.

The further sorting step includes:

sorting the plastic fragments into first and second kinds of fragments, the first kind comprising plastic fragments of sizes larger than the sizes of the plastic fragments of the second kind;

cooling the plastic fragments of the first kind to a temperature at which the plastic fragments of the first kind can be crushed by cryogenic crushing;

crushing the thus cooled plastic fragments into plastic pieces;

sorting the thus crushed plastic pieces into first and second classes, the first class comprising plastic pieces of sizes larger than the sizes of plastic pieces of the second class; and subjecting the second kind of plastic fragments and the second class of plastic pieces to a specific gravity sorter.

The present invention further provides a waste article disposing system operable to carry out the method pointed out in the preceding paragraph.

According to the present invention, almost whole parts of waste can be collected for further use, greatly reducing the demand for treatment such as burning of the waste. Thus, the present invention makes a great contribution to prevention of "warming" of the earth which is attributable to carbon dioxide generated as a result of the burning. Furthermore, the present invention is effective in collecting flon from foamed material in waste articles, thus contributing also remarkably to preservation of ozone layer.

The above and other objects, features and advantages of the present invention will become clear from the following description of the preferred embodiments taken in conjunction with the accompanying drawings.

BRIEF DESCRIPTION OF THE DRAWINGS

FIGS. 9 to 14 are illustrations of still another embodiment, wherein:

FIG. 9 is a schematic illustration showing an arrangement of a stock yard, a feeding apparatus, pretreatment apparatus and a metal bulk crushing apparatus;

FIG. 10 is a schematic illustration of the construction of a refrigerant collecting means;

FIG. 11 is a schematic illustration of the construction of a crushing apparatus and a light-weight waste separating apparatus;

FIG. 12 is a schematic illustration of the construction of a plastics sorting apparatus;

FIG. 13 is a schematic illustration of the construction of a plastics sorting apparatus; and FIG. 14 is a schematic illustration of the construction of a foaming agent collecting apparatus;

FIGS. 15 to 20 are illustrations of a further embodiment of the present invention, wherein:

FIG. 16 is a schematic illustration of the construction of a crushing apparatus;

FIG. 17 is a schematic illustration of the construction of a metal bulk crushing apparatus;

FIG. 18 is a schematic illustration of the construction of a metal separating apparatus;

FIG. 19 is a schematic illustration of the construction of a plastics sorting apparatus;

FIG. 20 is a schematic illustration of the construction of a foaming agent collecting apparatus;

FIG. 30 is a schematic illustration of the construction of a metal/non-metal separating apparatus of the waste disposal system of the present invention.

DESCRIPTION OF THE PREFERRED EMBODIMENTS

Figure 1:
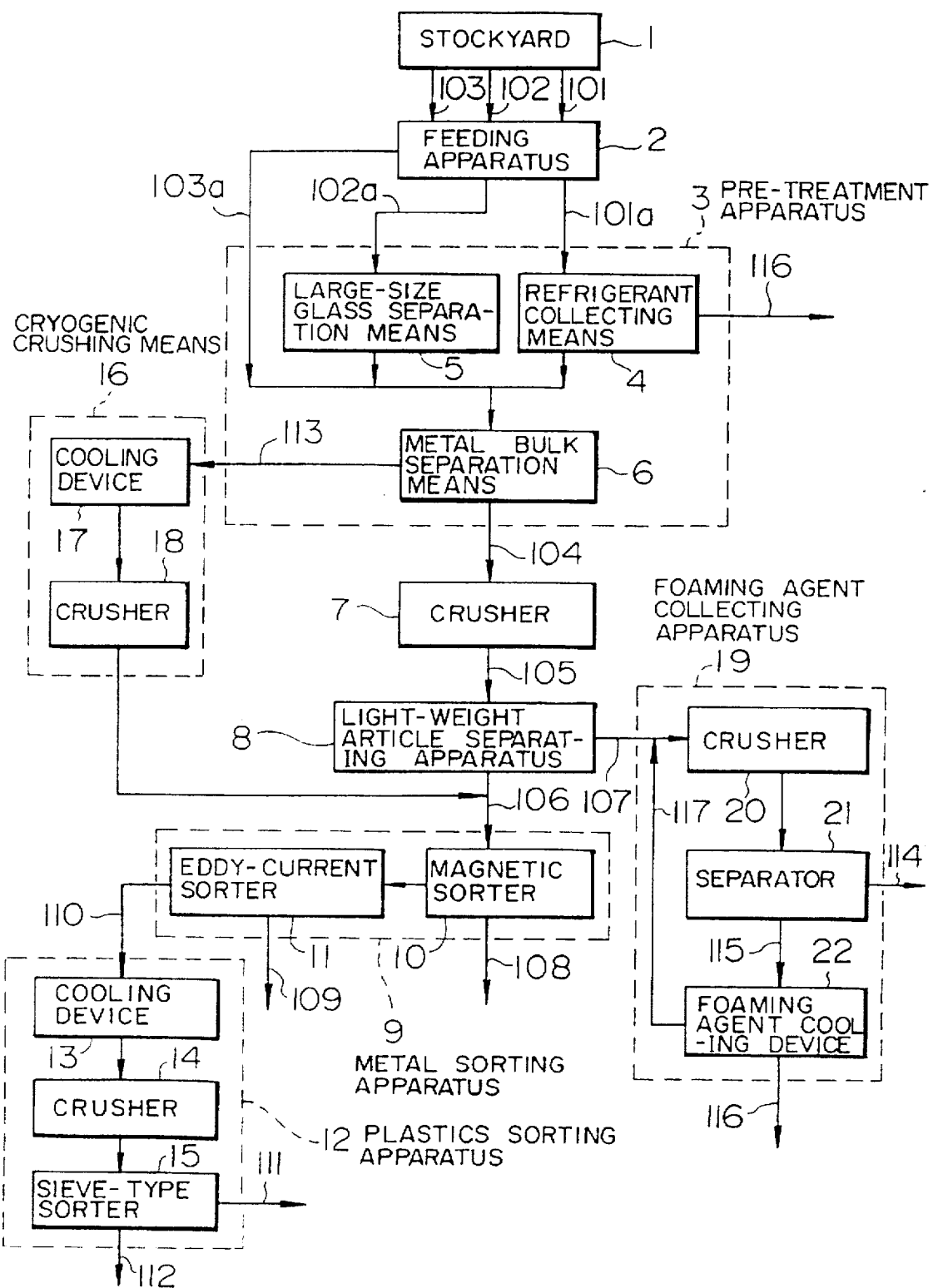
FIG. 1 is a block diagram showing the construction of the whole of an embodiment of the waste disposal system in accordance with the present invention.

An embodiment of the waste disposal system of the present invention will be described with reference to FIG. 1 which is an illustration of the whole part of the embodiment. Referring to this Figure, the waste disposal system includes a stock yard 1 in which waste articles roughly sorted according to types are stored, a feeding apparatus 2 and a pre-treatment apparatus 3 to which the waste articles are fed by the feeding apparatus 2. The pre-treatment apparatus includes a refrigerant collecting means 4, a large-size glass separating means 5 and a metal bulk separating means 6. The disposal system further has a crushing apparatus 7 which has one or two crushing stages, a light-weight waste separating apparatus 8, and a metal sorting apparatus 9. The metal sorting apparatus 9 includes a magnetic sorter 10 and an eddy-current sorter 11. The system further has a plastics sorting apparatus 12 which includes a cooling device 13, a crusher 14 and a sieve type sorter 15. The system further has a cryogenic crushing apparatus 16 for crushing metal bulks. This apparatus 16 includes a refrigerator 17 and a crusher 18. The system further has a foaming agent collecting apparatus 19 which includes a crusher 20 for crushing foamed articles, a separator 21 for separating foaming agent and resin components from each other and a foaming agent cooling device 22.

Wasted household electric machines collected by a collecting truck are roughly sorted into four types: namely, refrigerators, air conditioners, televisions and laundry machines and are stored in the stock yard 1. The wasted household electric machines of each type are then fed by the feeding apparatus 2 into the pre-treatment apparatus. In the pre-treatment apparatus 3, refrigerants in the refrigerators and air conditioners are extracted as indicated by arrows 101 and 101a by the refrigerant collecting means 4 which will be detailed later and which is incorporated in the pre-treatment apparatus 3, and the extracted refrigerant is collected as indicated by the arrow 116. Subsequently, the compressor is detached from each refrigerator by the metal bulk separating means 6. When the waste articles are televisions, large-size glass separating means 5 in the pre-treatment apparatus 3 detaches cathode ray tubes from the television units, as indicated by arrows 102, 102a. In the case where the waste is a machine other that refrigerator, air conditioner and television, e.g., a laundry machine, metal bulks such as motor are detached from the waste by the metal bulk separating means 6, as indicated by arrows 103, 103a. The metal bulk separating means 6 may include a guillotine-type machine which is a kind of shearing machines. The large-size glass separating means 5 may be of an impact type which crushes glasses by striking them several times by a hammer or of compression type which crushes glasses by compression.

As a result of the pre-treatment, metal bulks are removed from the wasted household electric machines, and the residue components are sent as indicated by arrow 104 to the crushing apparatus 7 which crushes the residue components into fragments of 50 to 100 mm by a single or dual stage crushing mechanism. The fragments are then sorted according to the kind of material. The use of dual- or multi-stage crushing mechanism is preferred for handling refrigerators because such waste requires separation of foamed urethane from a thin iron sheets.

The waste fragments generated by the crushing apparatus 7 and then sorted according to the type of material are then forwarded to the light-weight article separating apparatus 8 which separate light-weight fragments such as pieces of foamed urethane, as indicated by an arrow 105. The light-weight fragments thus separated is delivered to the foaming agent collecting apparatus 19 as indicated by an arrow 107, whereas heavy fragments separated from the foamed fragments are sent to the metal sorting apparatus 9, as indicated by an arrow 106. The light-weight article separating apparatus 8 may be of the type which blows air to the waste fragments discharged from the crushing apparatus 7 so as to sort foamed fragments out of other fragments, by making use of the fact that the specific gravities of such fragments are much smaller than those of other fragments. Alternatively, an inclined vibration conveyor is used as the light-weight article separating apparatus, such that light-weight foamed fragments are taken out from an upper part of the conveyor while heavier fragments are collected from a lower portion of the conveyor.

Metal bulks such as compressors or motors separated by the metal bulk separating apparatus 6 of the pre-treatment apparatus 3 are sent as indicated by an arrow 113 to the refrigerating crushing apparatus 16. In this apparatus 16, the metal bulks are cooled to a very low temperature of −100° C. or lower by the cooling device 17 and are crushed into fragments by the crusher 18. The crushing is performed with comparatively small impact force, by virtue of cold embrittlement generally exhibited by metals. The metal fragments thus obtained are delivered to the metal sorting apparatus 9 as indicated by the arrow 106, together with the heavy components from the light-weight article separation apparatus 8.

Ferrous metal fragments are first sorted out of the metal fragments by means of the magnetic sorter 10 in the metal sorting apparatus, and are collected as indicated by an arrow 108. Subsequently, non-ferrous metal fragments are separated by the eddy-current sorter 11 and are collected as indicated by an arrow 109. Thus, the residue consists mainly of plastics. The plastics fragments are then sent to the plastics sorting apparatus 12 as indicated by an arrow 110. As described before, the plastics sorting apparatus 12 includes a cooling device 13, a crusher 14 and a sieve type sorter 15. The plastics fragments supplied to the plastics sorting apparatus 12 are first cooled by the cooling device 13 to a temperature between 0° C. and −60° C. and are crushed by the crusher 14 which is typically an impact type crusher. The plastics sorting apparatus 12 sorts plastics fragments according to the difference in embrittlement temperature between different types of plastics. Vinyl chloride type plastics generally exhibit higher embrittlement temperatures than other plastics and, therefore, are crushed into fragments finer than those of other plastics. The fragments crushed by the crusher 14 are sent to the sieve type sorter which sorts the plastics fragments into finer ones which are mainly composed of vinyl chloride type plastics and comparatively large plastics fragments which contain only a small amount of vinyl chloride type plastics. Thus, the plastics of vinyl chloride type are sorted as indicated by an arrow 111, while the remainder plastics are collected as indicated by an arrow 112 as plastics which are easy to reuse.

Meanwhile, the foamed articles separated by the light-weight article separating apparatus 8 are delivered as at arrow 107 to the foaming agent collecting apparatus 19 in which the foamed articles are crushed by the crusher 20 and then sorted into solid plastics and gaseous foaming agent by the separator 21. The solid plastics are collected as indicated by an arrow 114, while the gaseous foaming agent is mixed with the ambient air and the mixture is sent to the cooling device 22 as indicated by an arrow 115. The gaseous mixture is cooled by the cooling device 22 so that the foaming agent is liquefied and collected as indicated by an arrow 116, whereas the air is returned to the crusher 20 as indicated by an arrow 117. Consequently, flon gas used as the foaming agent and the plastics are separated from each other and are collected independently.

It is thus possible to sort and collect flon-type refrigerant or foaming gases which hitherto could not be collected. In addition to recovery of metal components, plastics also are sorted and plastic components which are suitable for reuse are collected for further use, so that the amount of waste to be sent for reclamation is greatly reduced.

In the described embodiment, detaching of the metal bulks such as compressors and motors performed by the pre-treatment apparatus 3 is intended for ensuring safe functioning, as well as long life, of the crushing apparatus 7. In the embodiment as described, the crushing apparatus 7 plays a double role of shearing thin metals and separation of metals from plastics. Thus, the crushing apparatus 7 is designed so as to be able to shear metal sheets of thicknesses around 0.1 mm. Therefore, if the metal bulks such as motors are introduced into the crushing apparatus 7, shearing blades are seriously damaged to disable the crushing apparatus 7 to perform the above-mentioned double role. The crushing apparatus 7 is the apparatus which initially crush large-size articles and, hence, may be heavily burdened. Crushing of metal bulks with this apparatus 7 therefore would surely cause locking of the apparatus.

Figure 2:
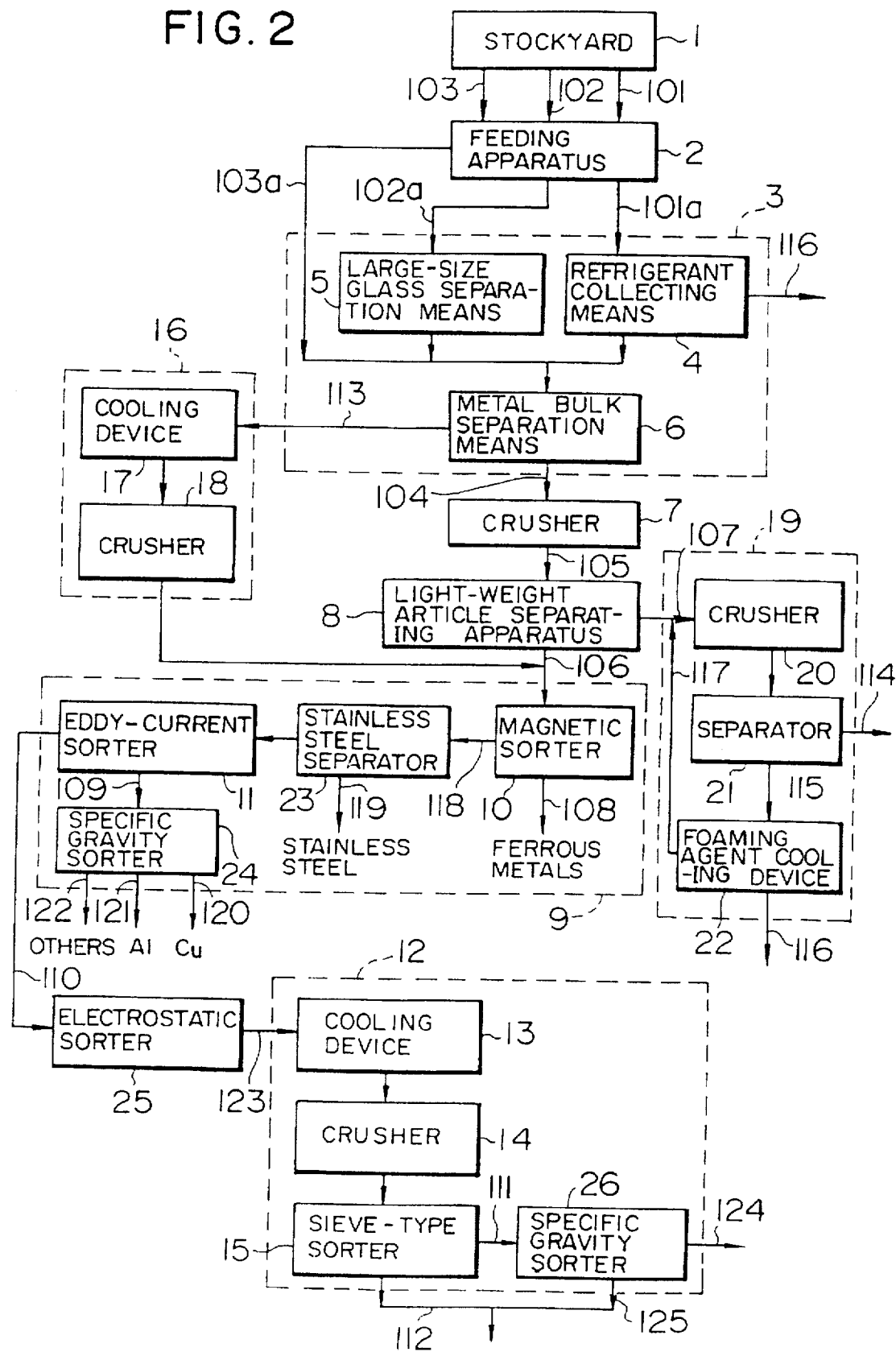
FIG. 2 is a block diagram similar to FIG. 1 but showing another embodiment of the present invention.

Another embodiment of the present invention will be described with reference to FIG. 2. Referring to FIG. 2, the waste disposal system as another embodiment has a metal sorting apparatus 9 which is similar to that used in the first embodiment except that it additionally includes a stainless steel separator 23 and a specific gravity sorter 24. The system also has a plastic sorting apparatus 12 which is basically the same as that in the first embodiment except that it additionally has a specific gravity sorter 26. The system further has an electrostatic separator 25 provided between the metal sorting apparatus 9 and the plastics sorting apparatus 12. In some cases, the metal fragments after separation of ferrous metal fragments performed by the magnetic sorter 10 include fragments of stainless steel which is generally considered as being non-magnetic. Furthermore, the fragments also may contain wood pieces which are generated when wooden television casing have been crushed. The embodiment shown in FIG. 2 is intended to cope with demands for separation and collection of stainless steel and wood. Although stainless steel is generally considered as being non-magnetic, stainless steel, when subjected to cutting, bending or other machining, exhibits local changes in the metallurgical structure, which allows magnetization although the extent of the magnetization is very slight. The stainless steel separator 23 used in this embodiment is capable of generating much stronger magnetism than that generated by ordinary magnetic sorter used for separation of ferrous metals, and is capable of separating stainless steel fragments which have been magnetized slightly.

The non-ferrous metal fragments separated by the eddy-current sorter 1 and collected as indicated by the arrow 109 are delivered to the specific gravity sorter 24 which sorts such non-ferrous metal fragments according to the kind of material so as to facilitate reuse of the materials. In this embodiment, the non-ferrous metal fragments are sorted into three types: copper fragments collected as indicated by an arrow 120, aluminum fragments collected as indicated by an arrow 121 and other non-ferrous metal fragments collected as denoted by an arrow 122. The reference specific gravity liquid to be used in the specific gravity sorter 24 should have a specific gravity not smaller than 2.0, considering that the liquid is used for sorting metals. Such requirement is met by only few metals. Therefore, this embodiment employs, as the reference specific gravity liquid, a magnetic fluid which seemingly exhibit different values of specific gravity according to the intensity of magnetic field applied thereto. By employing two different magnetic intensity levels, it is possible to sort three kinds of non-ferrous metals. Another specific gravity liquid may be water or oil with metal powder suspended therein to control the specific gravity of the liquid.

Consequently, the waste fragments discharged from the metal sorting apparatus 9 as indicted by arrow 110 are mainly plastics fragments. It is, however, conceivable that wood fragments generated from, for example, television case are also included. In order to facilitate reuse of the finally sorted plastics, it is desirable that such wood fragments are separated from the plastics. To enable such separation, the embodiment shown in FIG. 2 employs the aforementioned electrostatic separator 25 connected to the outlet end of the metal sorting apparatus 9. The electrostatic separator 25 is composed of a separator alone or a drier and a separator. The electrostatic separator 25 is capable of separating different materials from one another by making use of electrostatic chargeability of the materials. Wood fragments can easily be separated because wood generally exhibits much smaller chargeability than plastics.

The waste fragments discharged from the electrostatic separator 25, mainly composed of plastic fragments, are sent to the plastics sorting apparatus 12 as indicated by an arrow. The plastics fragments are then sorted into two groups: a first group rich in vinyl chloride type plastics fragments collected as indicated by an arrow 111 and a second group which contain only a small amount of vinyl chloride type plastics and which are collected as denoted by 112. The waste fragments indicated by the arrow 111, however, still contain plastics which are other than vinyl chloride type plastics and which are reusable. It is therefore desirable that such reusable plastics are separated and collected from the waste fragments indicated by the arrow 111. To meet such a demand, the embodiment shown in FIG. 2 employs the specific gravity sorter 26. Plastics of vinyl chloride type generally exhibit comparatively large specific gravity values, e.g., 1.2 to 1.6. Fragments of vinyl chloride type plastics, therefore, are precipitated in the specific gravity sorter 26 and are collected as indicated by an arrow 124, whereas reusable plastic fragments are separated by flotation and collected as indicated by an arrow 125. The embodiment shown in FIG. 2 provides additional advantages over the embodiment shown in FIG. 1 in that the metal fragments are further sorted and the rate of recovery of reusable plastics is enhanced. In the embodiments shown in FIGS. 1 and 2, each of the magnetic sorter 10, the eddy-current sorter 11 and the stainless steel sorter 23 in the metal sorting apparatus 9 has a single staged structure. Each of such sorters, however, may have plural stages according to the sorting demand. A further improvement in the sorting efficiency can be attained by using such multi-stage sorters. The specific gravity sortors 24 and 26 may also be of multi-staged structures to increase the number of sorting and improve the sorting efficiency.

Figure 3:
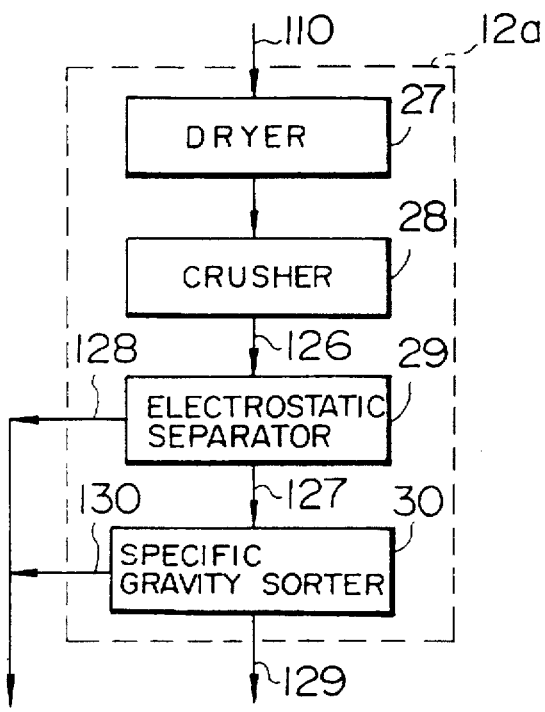
FIG. 3 is a block diagram showing the construction of a modification to a plastics sorting apparatus used in the system shown in FIGS. 1 and 2.

FIG. 3 shows a modification which employs a plastics sorting apparatus 12a which is different from the plastics sorting apparatus 12 used in the preceding embodiment. The plastic sorting apparatus 12a includes a dryer 27, a crusher 28, an electrostatic separator 29 and a specific gravity sorter 30. Waste articles, separated from the metals by a metal sorting apparatus 9 which may be of the same type as that in FIGS. 1 or 2, are dried by the drier 27 and crushed by the crusher 28 into grains of a regulated size. The plastics waste granules of the regulated size are sent to the electro-static separator 29 which separates the plastic grains into two groups: a first group mainly consisting of plastics having high electrostatic chargeability, e.g., polyethylene resin and vinyl chloride resin, sorted as indicated by an arrow 127, and a second group consisting mainly of other plastics having small levels of electro-static chargeability and denoted by 128. The first group of plastics having high electrostatic chargeability contains plastics fragments of vinyl chloride type, so that this group is sent to the specific gravity sorter 30 in which the plastic granules of vinyl chloride type are separated and removed as indicated by an arrow 129, while plastics suitable for reuse are collected as indicated by an arrow 130.

The use of the dryer 27 is not essential. Namely, it is possible to omit the dryer 27 provided that the waste introduced into the plastic sorting apparatus 12a is dry. Thus, the plastic sorting apparatus 12a, with the dryer omitted, may be used in the embodiment shown in FIG. 2.

Figure 4:
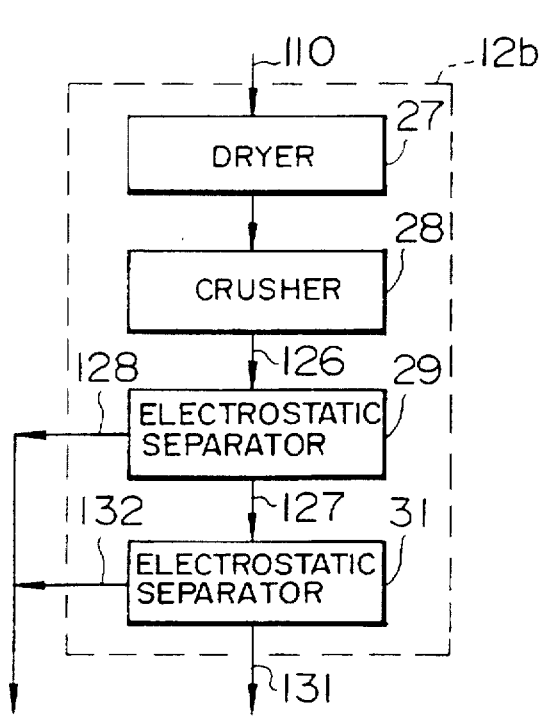
FIG. 4 is a block diagram similar to FIG. 3 but showing another modification.

Another modification having a still different type of the plastic sorting apparatus is shown in FIG. 4. The plastic sorting apparatus 12b used in this modification employs a multi-stage electrostatic sorter for separating plastics. More specifically, this plastics sorting apparatus 12b employs a drier 27, a crusher 28 through which waste granules of a regular size are obtained, a first stage electrostatic separator 29 which separates, as indicate by an arrow 127, plastics of polystyrene type and vinyl chloride type having high electrostatic chargeability, and a second-stage electrostatic separator 31 which separates polystyrene type plastics 132 and vinyl chloride type plastics 131 from each other.

Figure 5:
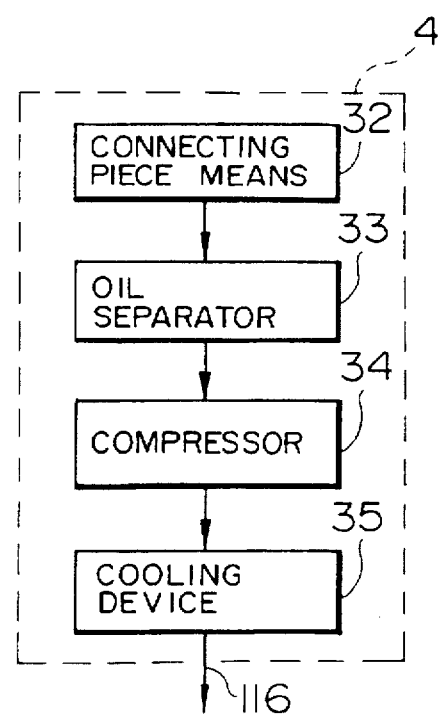
FIG. 5 is a block diagram showing practical construction of a refrigerant collecting means used in the apparatuses shown in FIGS. 1 and 2.

FIG. 5 shows an example of the refrigerant collecting means or apparatus 4. The refrigerant collecting apparatus 4 has a connecting piece means 32 for extracting refrigerant from a refrigerator, an oil separator 33 for separating lubricating oil from the refrigerant-oil mixture, a compressor 34 for generating refrigerant collecting power, a cooling device 35 for cooling and liquefying the refrigerant, and a piping which interconnects these components to form a system isolated from the ambient air. In operation of the refrigerant collecting apparatus 4, the compressor 34 is activated to lower the internal pressure of a section of the above-mentioned closed system between the connecting piece means 32 upstream of the compressor 34 and the oil separator 33, so as to suck refrigerant from the refrigerator. Then, oil is separated in the oil separator, while the refrigerant is compressed by the compressor 34 to high pressure and temperature. The compressed refrigerant is then cooled by the cooling device 35 so as to be condensed into liquid phase. The refrigerant thus liquefied is collected in a refrigerant cylinder or the like (not shown), as indicated by an arrow 116. The connector piece means 32 may be of a type which has a keen stubbing projection capable of piercing the refrigerant piping to enable extraction of the refrigerant from the refrigerator.

Figure 6:
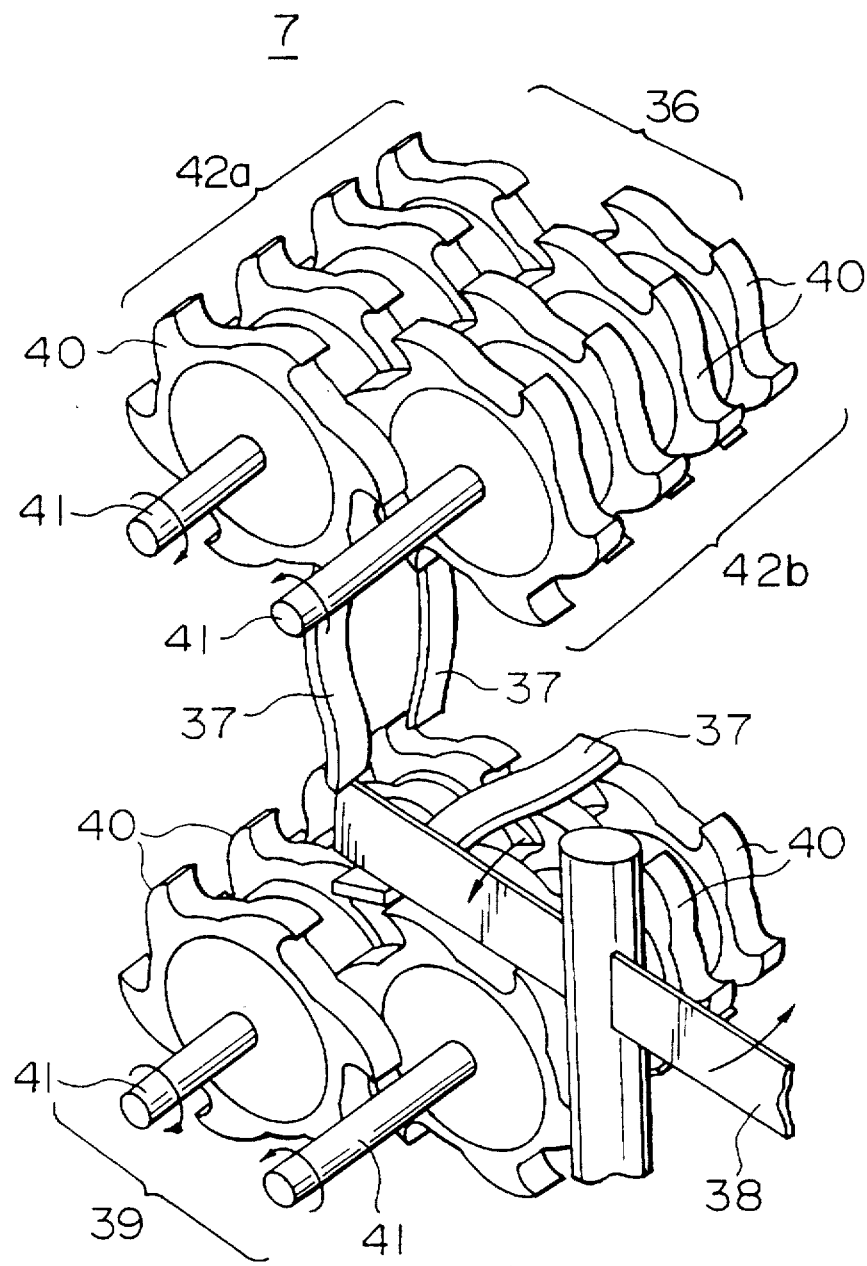
FIG. 6 is a perspective view of a crusher used in a crushing apparatus incorporated in the system shown in FIG. 1.

FIG. 6 illustrates an example of the crushing apparatus 7. As described before, the crushing apparatus has a function to coarsely crush waste articles and to sort the fragments according to the kind of the material, as well as a function to separate from panels of metals and plastics foamed urethane layers used as a thermal insulator in a refrigerator. The crushing apparatus 7 shown in FIG. 6 has a first-stage crusher 36 which crushes the waste into web-like pieces 37, rotary blades 38 for changing orientation of the web-like pieces 37 and a second-stage crusher 39 which crushes the web-like pieces 37 in directions different from those of crushing performed in the first stage. Each of the crushers 36 and 39 has a rotary cutter 42a, 42b having a pair of shafts 41 carrying a multiplicity of crusher blades 40 and arranged such that these blades are interdigitated.

Figure 7:
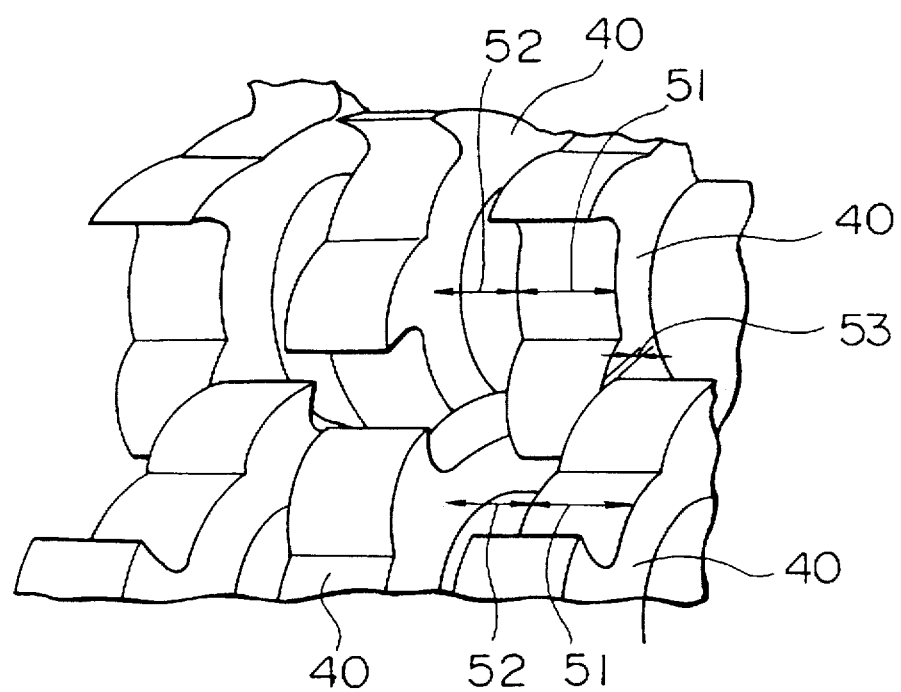
FIG. 7 is a fragmentary enlarged perspective view of a rotary blade of the crusher.

As will be seen from FIG. 7, the thickness 51 of the crusher blades 40 an the spacing 52 of the same are determined to be 50 to 100 mm, such that interdigitated crusher blades face each other at a distance 53 of 1 to 10 mm. With this arrangement, it is possible to shear the waste into fragments of 50 to 100 mm long. The clearance 53 between the crusher blades 42a and 42b of both rotary shafts slightly reduces the shearing effect but provides an appreciable effect to enable the crushers 36, 39 to apply to the waste fragments forces which act in such a direction as to exfoliate the material from metals. It is thus possible to separate thin layer of foamed material such as a heat insulator from metals on which such layer has been adhered.

Figure 8:
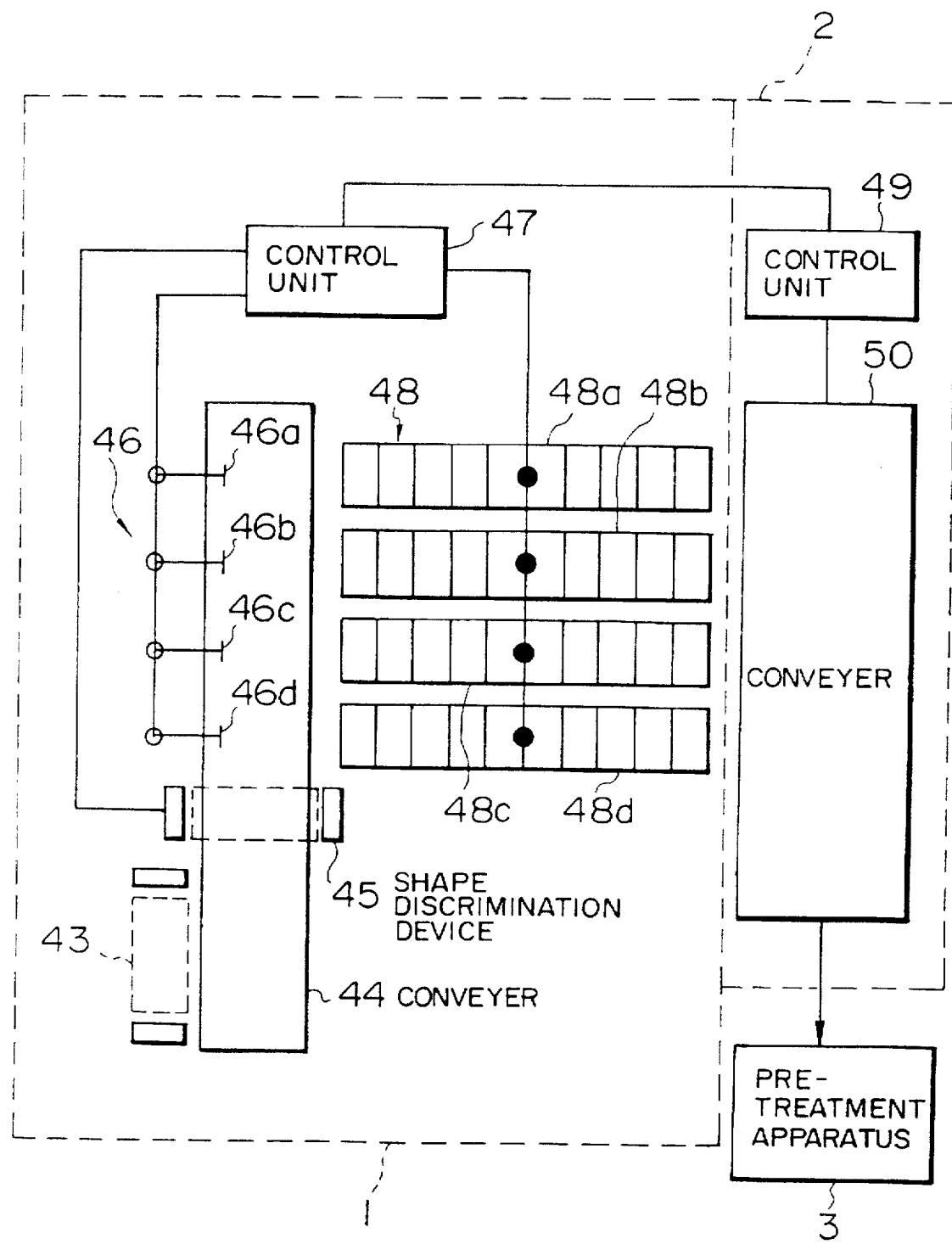
FIG. 8 is a schematic illustration showing an arrangement of a stock yard and a feeding apparatus in the systems shown in FIGS. 1 and 2.
Figure 9:
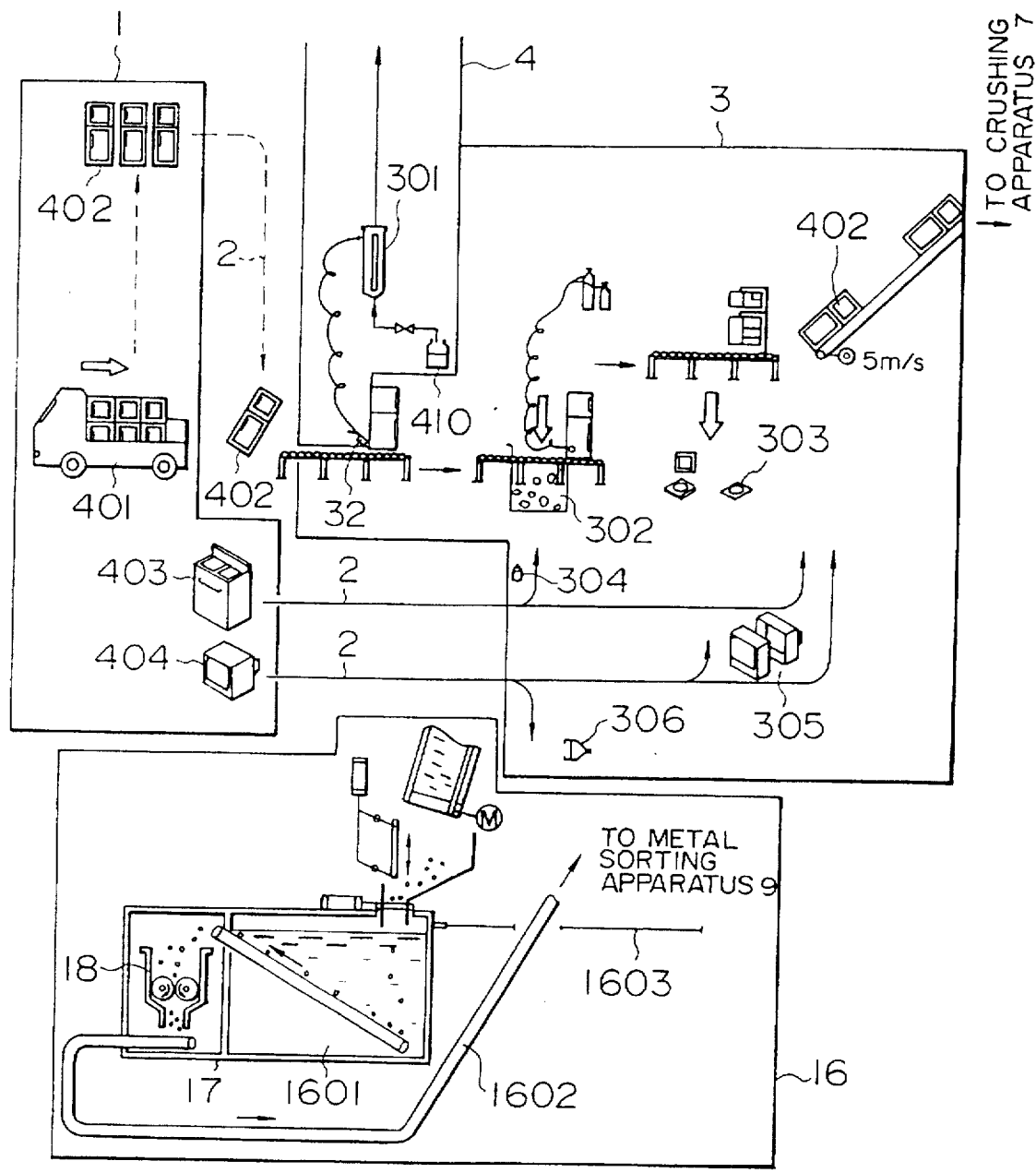
Figure 10:
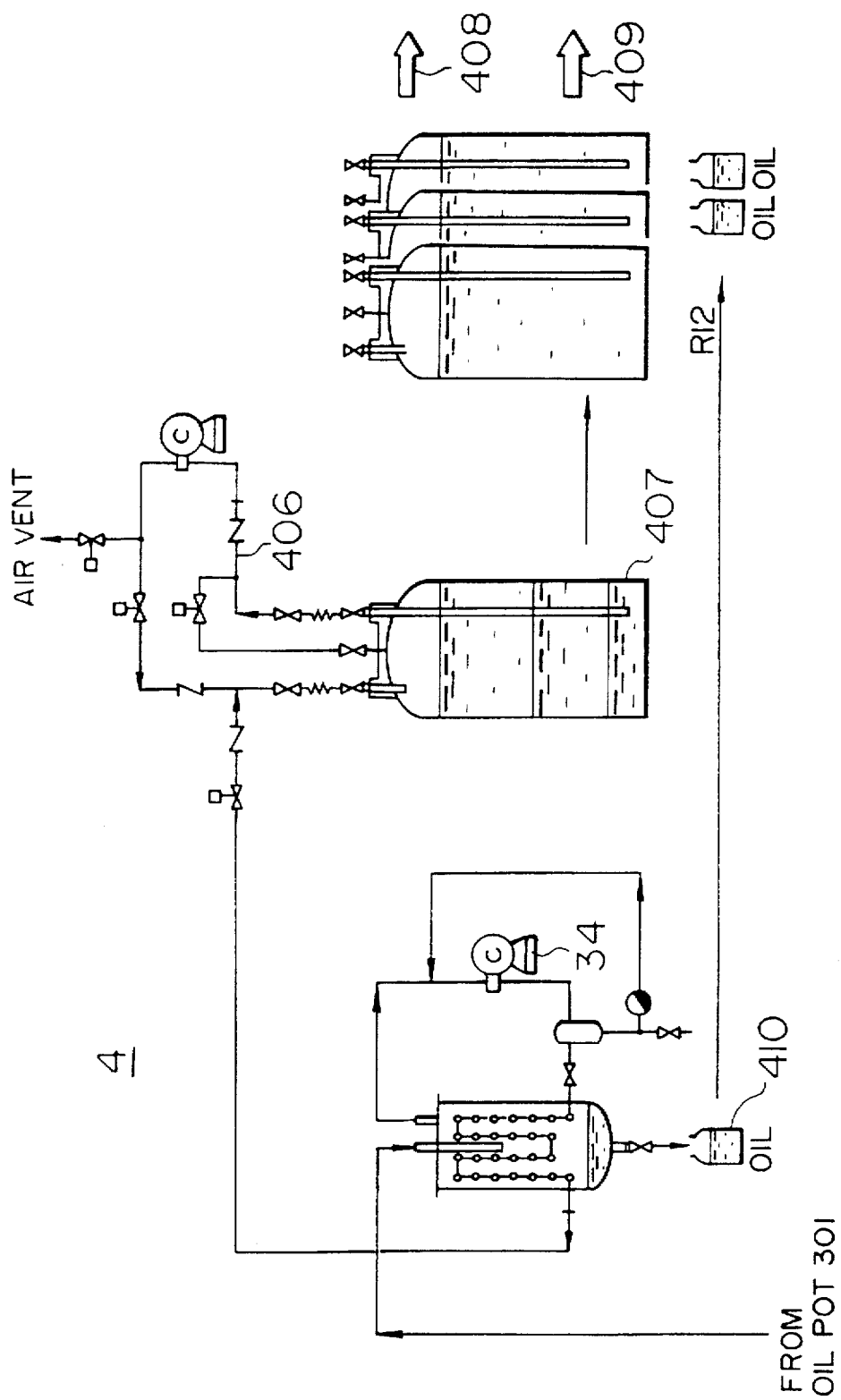

FIG. 8 illustrates an embodiment having a specific arrangement of the stock yard 1 and the feeding apparatus 2 designed to facilitate automatic operation of the whole system. The stock yard 1 has an entrance 43, a conveyor 44, a shape discriminating device 45, an exchanger 46, a control device 47 and storage conveyors 48a to 48d. In the illustrated arrangement, waste articles delivered by a collecting truck are moved onto the conveyor 44 through the entrance 43. During conveying by the conveyor 44, the waste articles are subjected to shape discrimination performed by the shape discrimination device 45 which is provided at an intermediate portion of the conveyor 44 so that the waste articles are discriminated according to their shapes into a plurality of types. The articles are further conveyed to the exchanger 46. Meanwhile, the control device 47 operates to select one of storage conveyors 48a to 48d on the basis of the discrimination data derived from the shape discrimination device 45, and activates the exchanging device 46 to direct each waste article to a corresponding storage conveyor, e.g., 48a, whereby the article is stored. Among the waste articles stored on the storage conveyors, the articles of the type designated by instructions from the control device 49 are then shifted onto the conveyor 50 and are sent to the pre-treatment apparatus 3 by means of this conveyor. The stockyard having the described arrangement can sort a number of waste articles according to the type of the articles and can store them for pre-treatment. The shape discrimination device 45 may be of the type which automatically discriminates configurations by using X-ray. Shape discrimination, however, may be conducted by naked eyes of an operator.

The waste disposal system of the invention having the described embodiment enables most part of waste articles to be collected and recovered for reuse. Thus, the present invention effectively reduces reclamation land area and enables efficient use of resources. Furthermore, the invention contributes to preservation of ozone layer around the earth, through collection of flon-type gases.

FIGS. 9 to 14 are illustrations of still another embodiment of the waste disposal system of the present invention. The system has a stock yard 1, a feeding apparatus 2, a pre-treatment apparatus 3 and a metal bulk crushing apparatus 16. Waste articles such as refrigerators 402, laundry machines 403, television 404 and the like, delivered by a collecting vehicle, are sent to the pre-treatment apparatus 3 by the feeding apparatus 2 which may be a conveyor. When the waste article to be pre-treated is a refrigerator, the pre-treatment apparatus 3 operates to extract refrigerant from the refrigerator, by the operation of a refrigerant collecting means 4. As will be seen from FIGS. 9 and 10, the refrigerant recovery means 4 includes a connecting piece means 32, an oil pot 301, a compressor 34 and a liquid circulating pump 406. The refrigerant and oil collected by the refrigerant collecting means 4 are respectively received in a refrigerant pot 407 and the oil collecting pot 410, and are forwarded to regenerating treatment factories as indicated by arrows 408 and 409.

Subsequently, metallic or metal-containing parts such as compressor 302 and magnet-containing packing rubber 303 are detached from the frame of the refrigerator 402. The frame is then delivered to a frame crushing apparatus 7 shown in FIG. 11. In the case where the article to be pre-treated is a laundry machine 403, metallic parts such as a motor and a clutch are detached, whereas, when the article is a television receiver 404, a cathode ray tube 306 is detached from the cabinet 305. In fact, most of the parts remaining after the removal of the cathode ray tube 306 is the cabinet 305. The residues are sent to a crushing apparatus 7 shown in FIG. 11.

The metal bulks 304 such as the compressor 302, motor and clutch removed by the pre-treatment apparatus 3 are crushed by the metal bulk crushing apparatus 16. The metal bulk introduced into the metal bulk crushing apparatus 16 is first cooled by a cooling medium 1601 such as liquefied air down to a temperature below embrittlement temperature of ferrous metals, and is crushed by impacts given by the crushing apparatus 18. Consequently, the ferrous metals are crushed into fine fragments which are then conveyed to a metal sorting apparatus 9 shown in FIG. 12, by means of a conveyor 1602. Meanwhile, the cooling medium which has been gasified by the heat derived from the metal bulk in the cooling device 17 is used as a cooling gas 1603 for cooling a foaming agent collecting apparatus 19 and/or a plastic sorting apparatus 12.

The articles brought into the crushing apparatus 7 are moved into a first crusher 703 at a rate regulated by a hydraulic control system 702, so as to be crushed into fragments of sizes around 100 mm and are further crushed by a second crusher 704 into finer fragments of sizes around 50 mm.

The waste articles crushed by the crushing apparatus 7 are then delivered to a light-weight article separating apparatus 8 having a windage separator 801 for separating foamed material such as foamed polyurethane. The waste articles after the separation of famed polyurethane therefrom are sent to the metal sorting apparatus 9 shown in FIG. 12, in which the article is subjected to a screening performed by a screen 901 of a mesh size between 80 and 100 mm, whereby stranded copper sheath wires are collected as indicated by an arrow 902. Then, ferrous metal fragments 908 are separated by two stages 903, 904 of magnetic sorter. Furthermore, an aluminum separator 905 having a rotary magnet separates aluminum 906 and other non-ferrous metals by means of eddy electric currents, and further separation of ferrous metals is effected magnetically. The residue obtained after the separation of these metal components is mainly composed of plastics waste fragments 907 which are sent to a plastic sorting apparatus 12 shown in FIG. 13. Meanwhile, the ferrous metals 908 and aluminum 906 separated in the metal sorting apparatus 9 are sent to respective factories for regeneration as indicated by arrows 909 and 910, respectively.

The waste fragments 907 mainly composed of plastics are received in the plastic sorting apparatus 12 and introduced into a cold chamber 1203. Liquefied nitrogen from a liquefied nitrogen tank 1201 is evaporated in an evaporator 1202 and the nitrogen gas of very low temperature thus obtained is introduced into the cold chamber 1203 so as to cool the waste fragments 907 down to a very low temperature of −20° C. to −40° C. The gas is again introduced to the evaporator 1202 by means of a blower. The waste cooled in the cold chamber is crushed by a sorting crusher 14. The fragments crushed and separated by the sorting crusher 14 are roughly classified by a sieve type separator 15. Consequently, a hopper 1208 disposed beneath the sieve receives plastics fragments rich in vinyl chloride. The fragments received in the hopper 1208, however, still contains plastics which are other than vinyl chloride and which are reusable. An aqueous separator, i.e., a specific gravity separator denoted by 1209, is employed in this embodiment for the purpose of efficient collection of such reusable plastics and sorting of the thus collected plastics.

Figure 11:
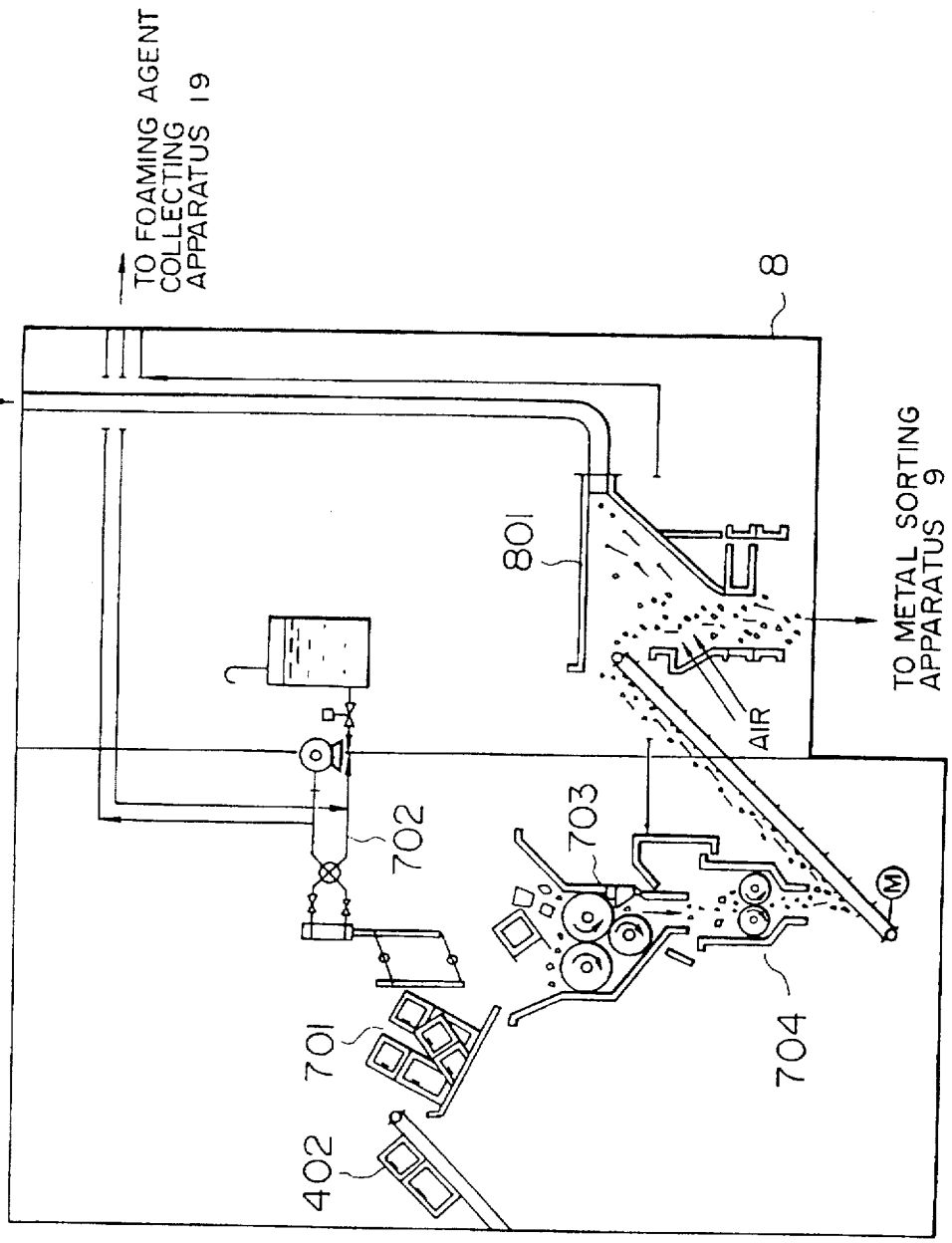
Figure 12:
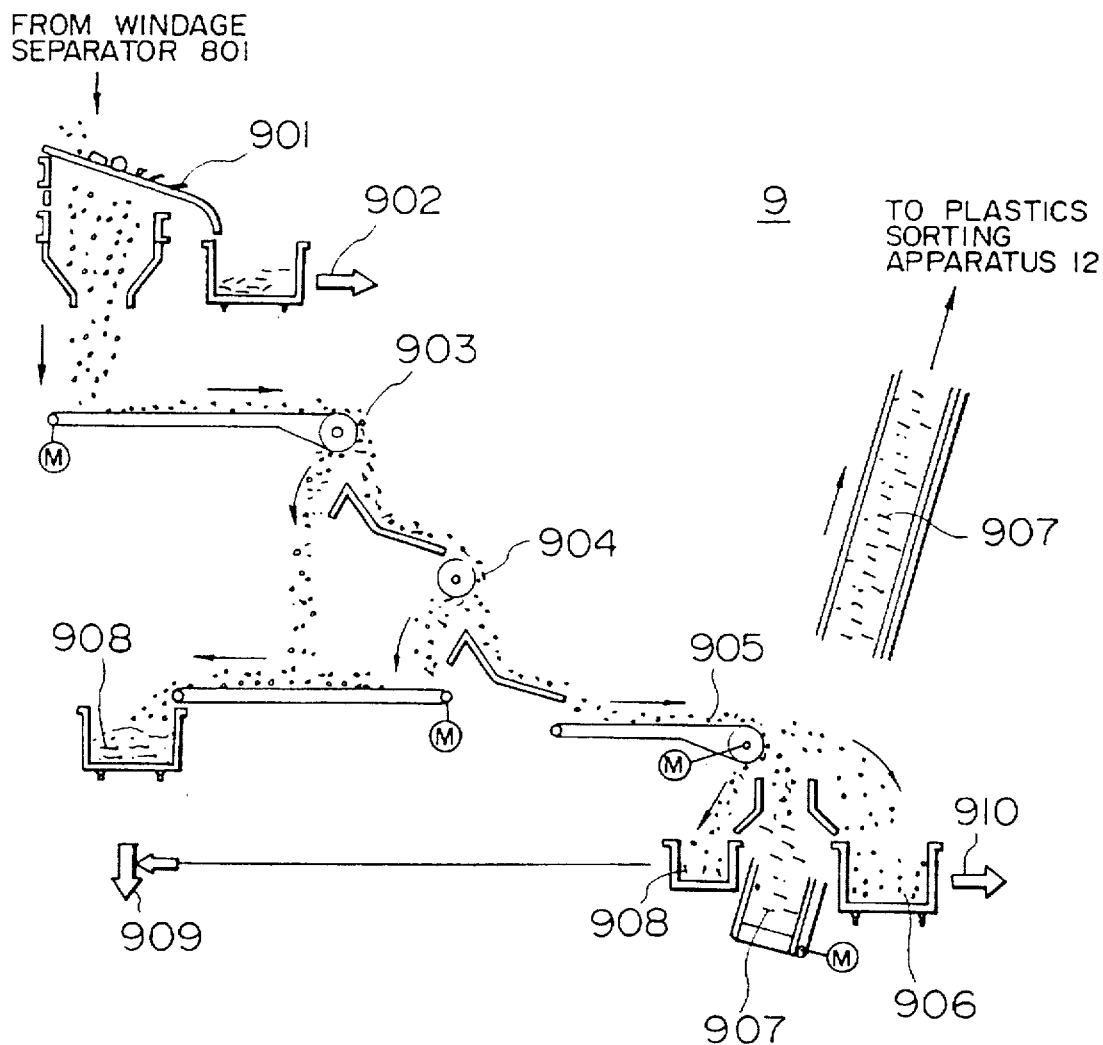
Figure 13:
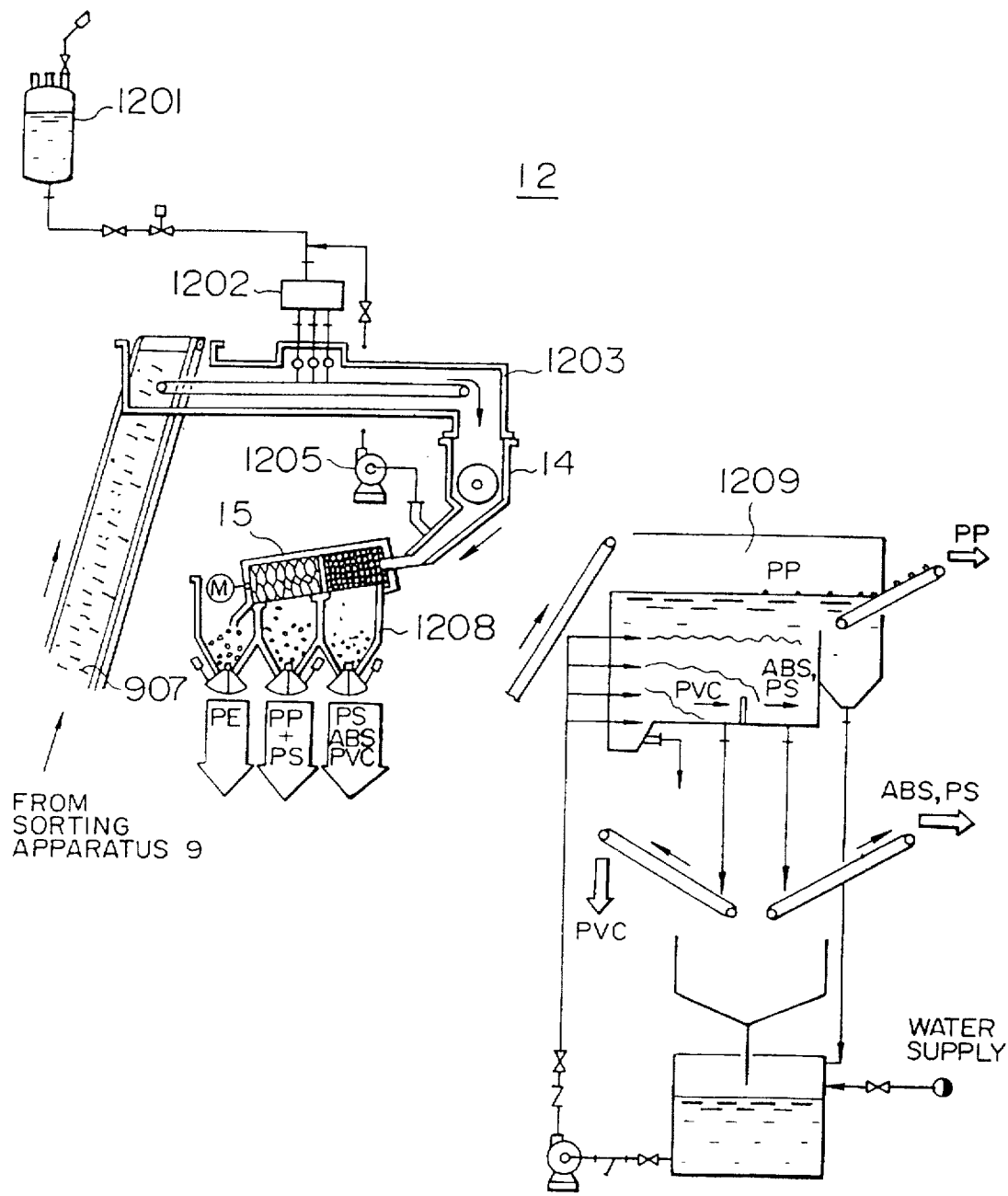
Figure 14:
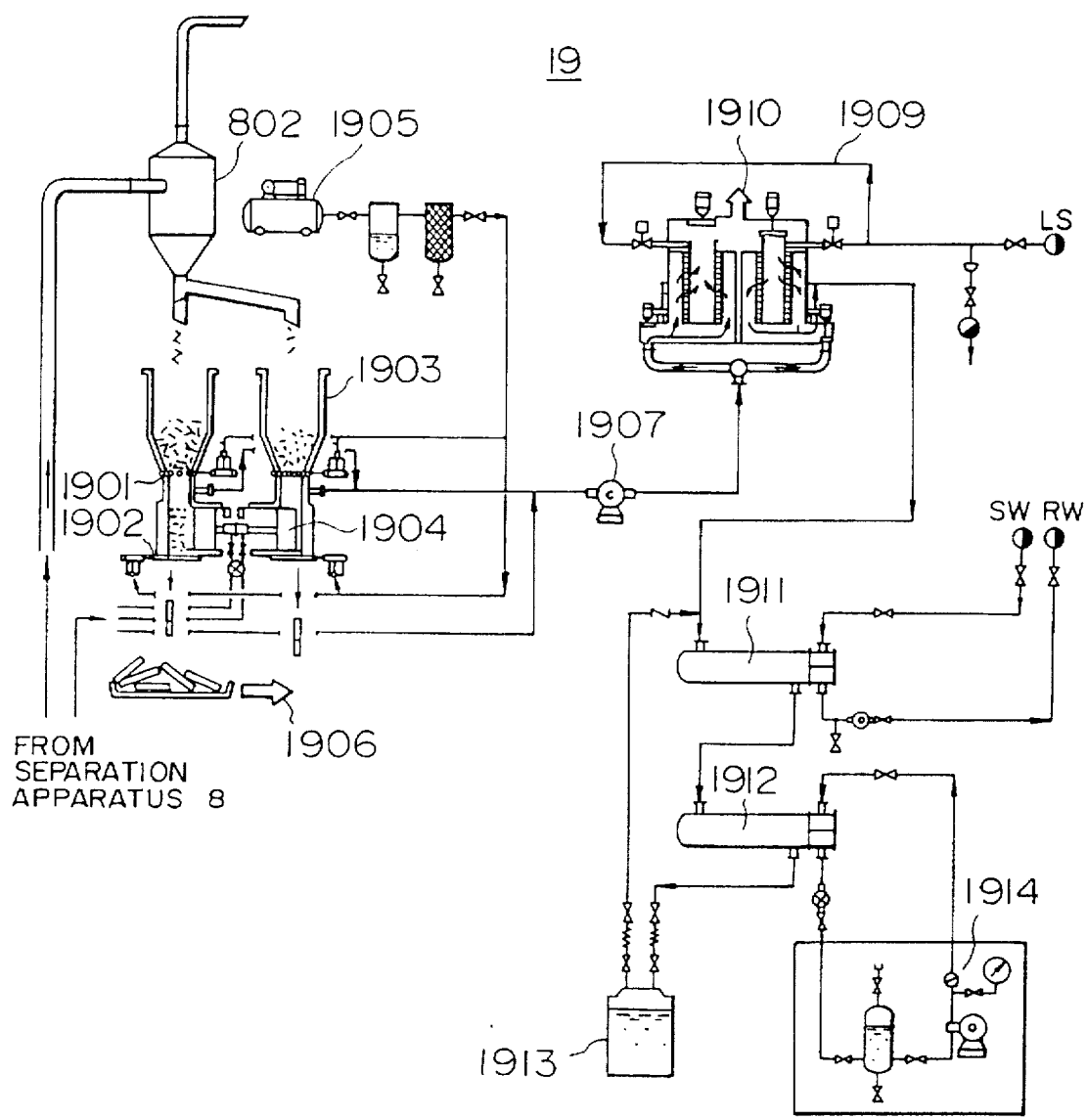
Figure 15:
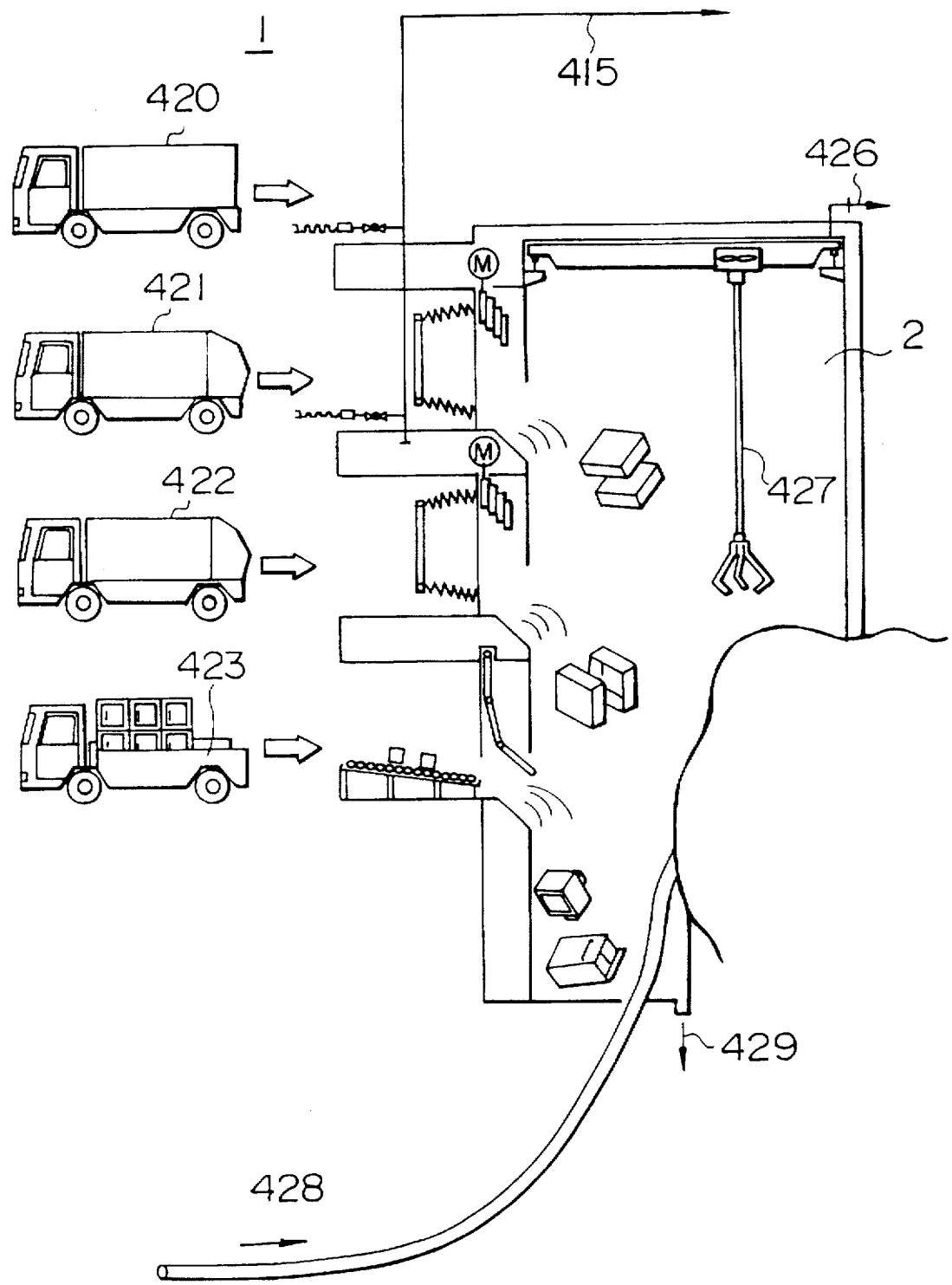

The foamed polyurethane separated by the windage separator 801 shown in FIG. 11 is then delivered to a foaming agent collecting apparatus 19. More specifically, the fragments of foamed articles are introduced into a cyclone separator 802 in which the fragments are separated from the conveyor suspension air and are introduced into a hopper 1903 which has a separation device 1904 having slide gates 1901 and 1902 which can close entrance and exit of the separation device 1904. The plastics and the foaming agent are separated by compression or crushing performed in the separation device 1904. The separated plastics are compacted by the separation device 1904 and is delivered to the exterior of the device 1904 through the slide gate 1902 and is sent as indicated by an arrow 1906 to a site where polyurethane is suitably disposed. Meanwhile, the foaming agent separated by the separation device 1904 is brought by a blower 1907 into contact with activated carbon of an adsorption device 1909 so as to be adsorbed by the activated carbon. The foaming agent is then released by application of heat and is then cooled and liquefied by coolers 1911, 1912 which make use of a cold heat source such as a cooling device 1914, so as to be collected in the form of liquefied foaming agent 1913.

In this embodiment, separate cold heat sources are used for the plastic sorting apparatus 12 and the foaming agent collecting apparatus 19. This arrangement, however, is only illustrative and the arrangement may be such that, when the refrigerating crushing is being conducted in the metal bulk crushing apparatus 16, the wasted cold heat 1603 (see FIG. 9) from the apparatus 16 is commonly used as the cold heat source both for the plastics sorting apparatus 12 and the foaming agent collecting apparatus 19.

FIGS. 15 to 20 show a further embodiment of the present invention which is devoid of the pre-treatment apparatus used in the preceding embodiments.

As shown in this Figure, the system has a stockyard 1 and a feeding apparatus 2. The stock yard 1 receives various waste articles collected and delivered by vehicles such as a flon collecting vehicle for local area service 420 (for air conditioners), a packer vehicle (with flon collecting system, including those for refrigerators) 421, a packer vehicle (with flon collection system, excluding refrigerators) 422 and a truck 423. The flon collected by the flon collecting vehicle 420 and the packer vehicle 421 is collected through a line as indicated by an arrow 415 so as to be bottled after separation of oil therefrom. The stock yard has a house-like structure the interior of which is hermetically sealed from the exterior as much as possible. In order to prevent spread of offensive smell, the air in the stockyard 1 is introduced into a deodoration apparatus as indicated by an arrow 426. The bilge (water and oil) generated in the stock yard is introduced into a bilge treating system as indicated by an arrow 429, through a drain provided in the bottom of the stockyard. The waste articles stored in the stockyard 1 is fed by a crane 427 of the feeding apparatus 2 to a crushing apparatus 7 shown in FIG. 16. The crushing apparatus 7 has a springing crusher 707 with an inlet which is adapted to be closed by an anti-explosion shutter 706. An emergency relief port 705 is formed in the top of the crusher 707. The anti-explosion shutter 706 and the emergency relief port 705 prevent accidental pressure rise in the crusher 707 which may be caused when, for example, a gas-containing vessel such as a gas cylinder still containing a gas is introduced as the waste article, thereby ensuring safety. The springing crusher 707 springs out metal bulks such as a motor or a compressor during crushing, while crushing other articles. The fragments obtained through the crushing are sent to a shredder. The articles springed by the crusher 707 are sent by a conveyor 709 to a metal bulk crushing apparatus 16. Meanwhile, rather small household electric machines such as a television receiver, a range or an audio equipment, denoted by 428, is directly sent to the shredder 711, bypassing the springing crusher 707. The shredder 711 shreds the fragments of wasted articles and also sorts the fragments according to the type of the material. Bilge such as oil generated in this shredder 711 is sent for disposal to a bilge treating system as indicated by an arrow 712. The fragments obtained through crushing and separation performed by the shredder 711 are sent to a windage separator 713 of a light-weight article separation apparatus 8 so that foamed urethane fragments are separated from rest portions. The rest portion of the fragments of the waste article is then sent to a metal sorting apparatus shown in FIG. 18. Meanwhile, plastics and the foaming agent in the foamed polyurethane are separated from each other, and the plastics thus separated are picked up and sent to the exterior. The foaming agent, together with the foaming agents separated in the springing crusher 707 and the shredder 711, is collected and sent to a foaming agent collecting apparatus 19 shown in FIG. 20.

Figure 17:
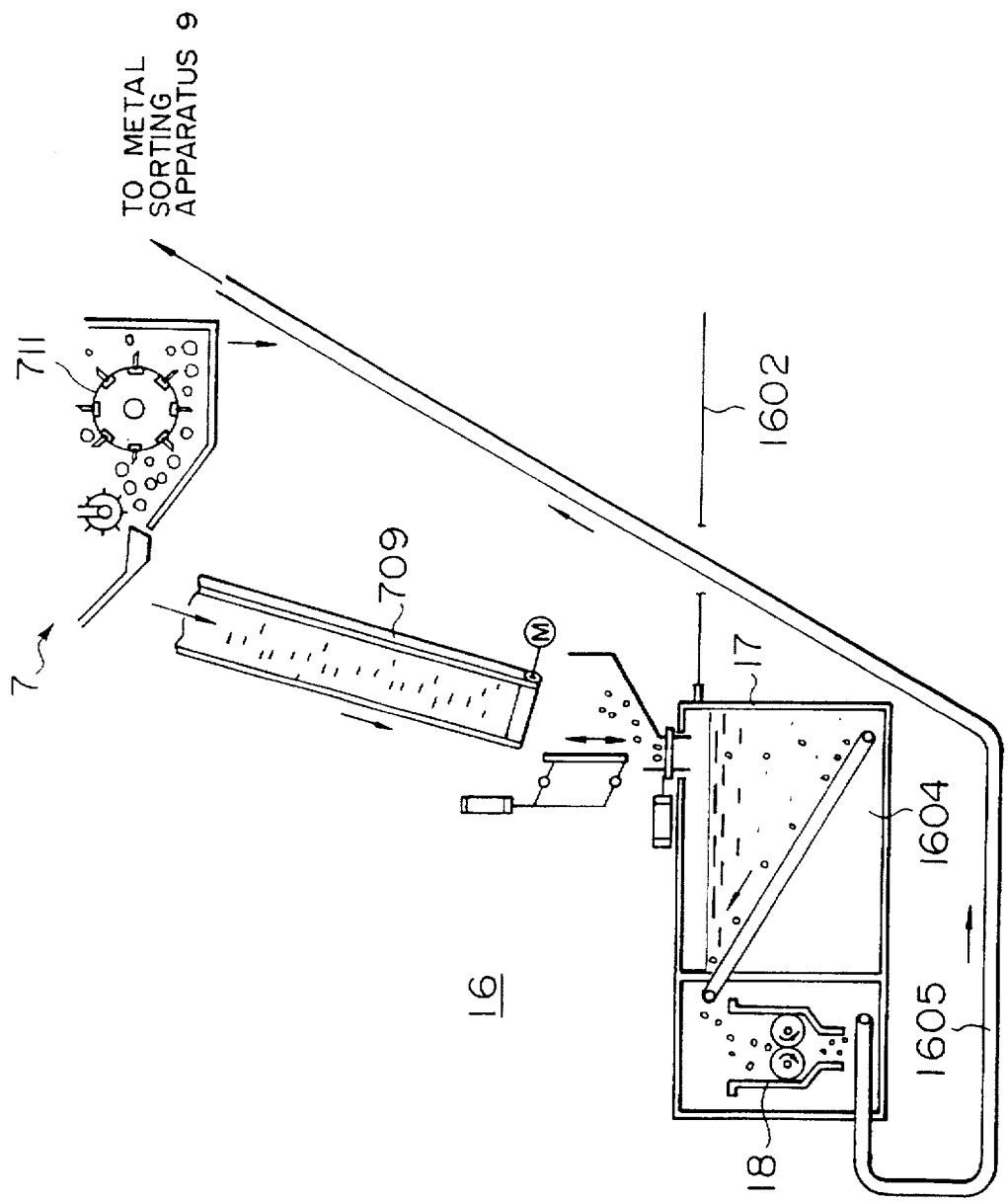
Figure 18:
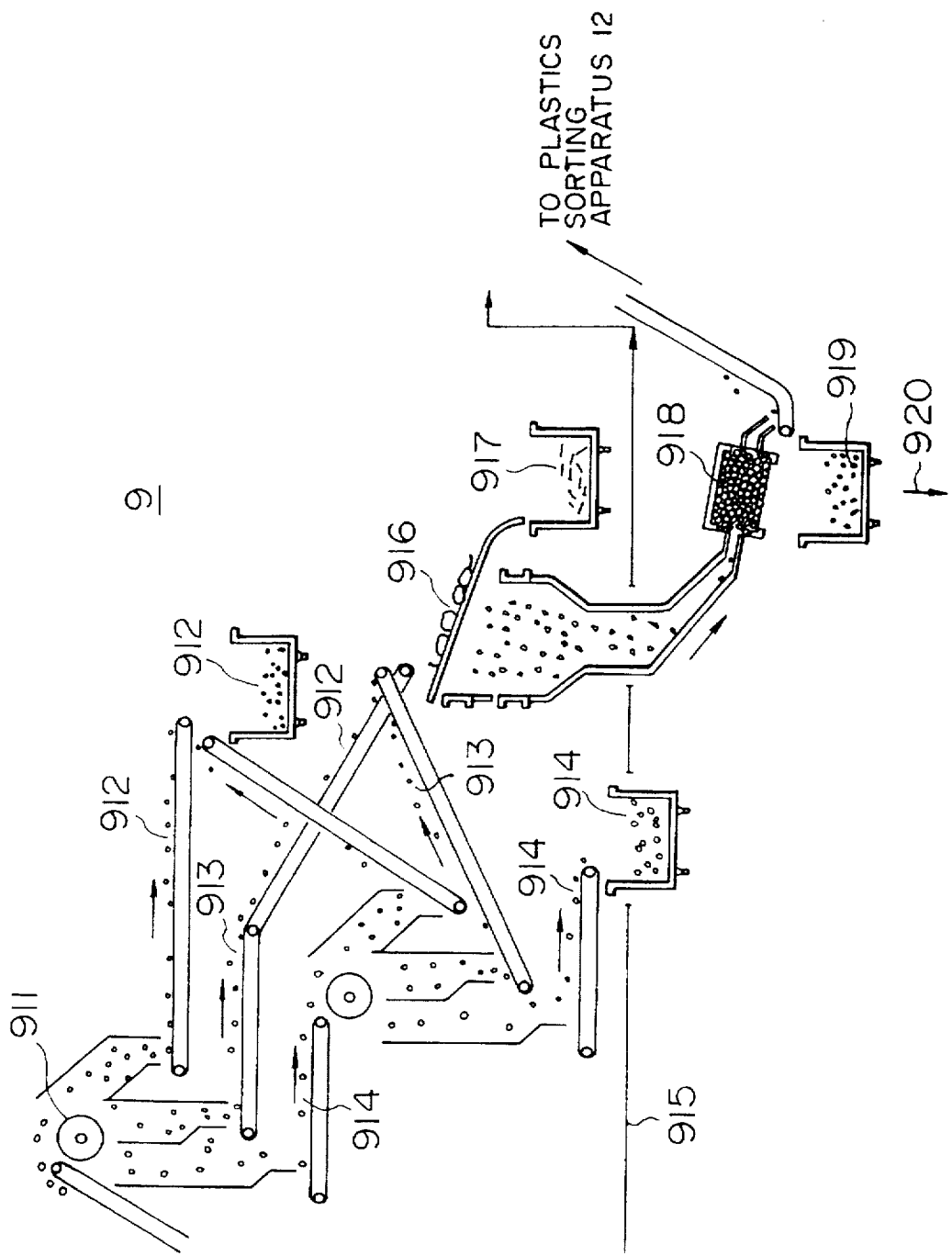
Figure 19:
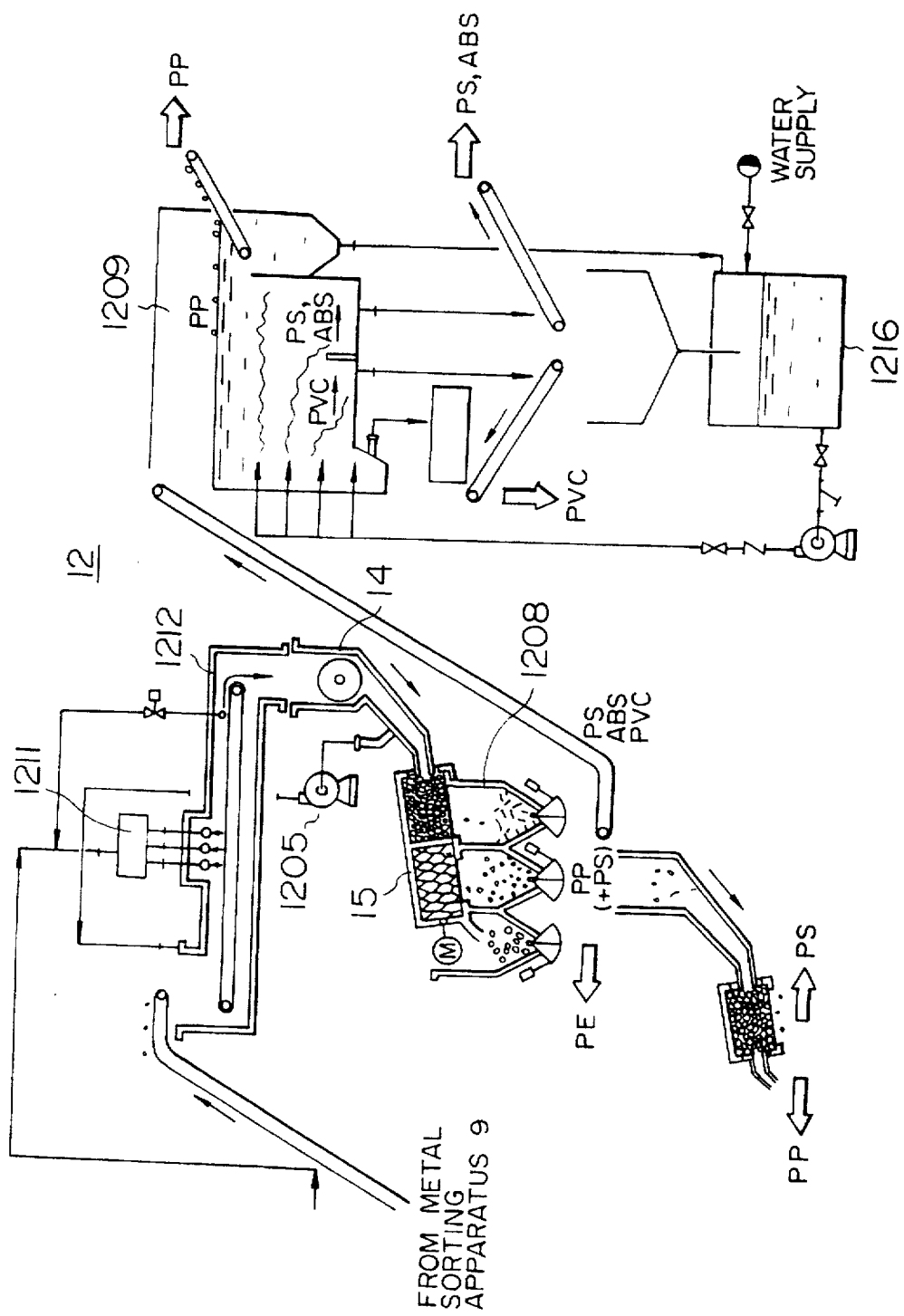
Figure 20:
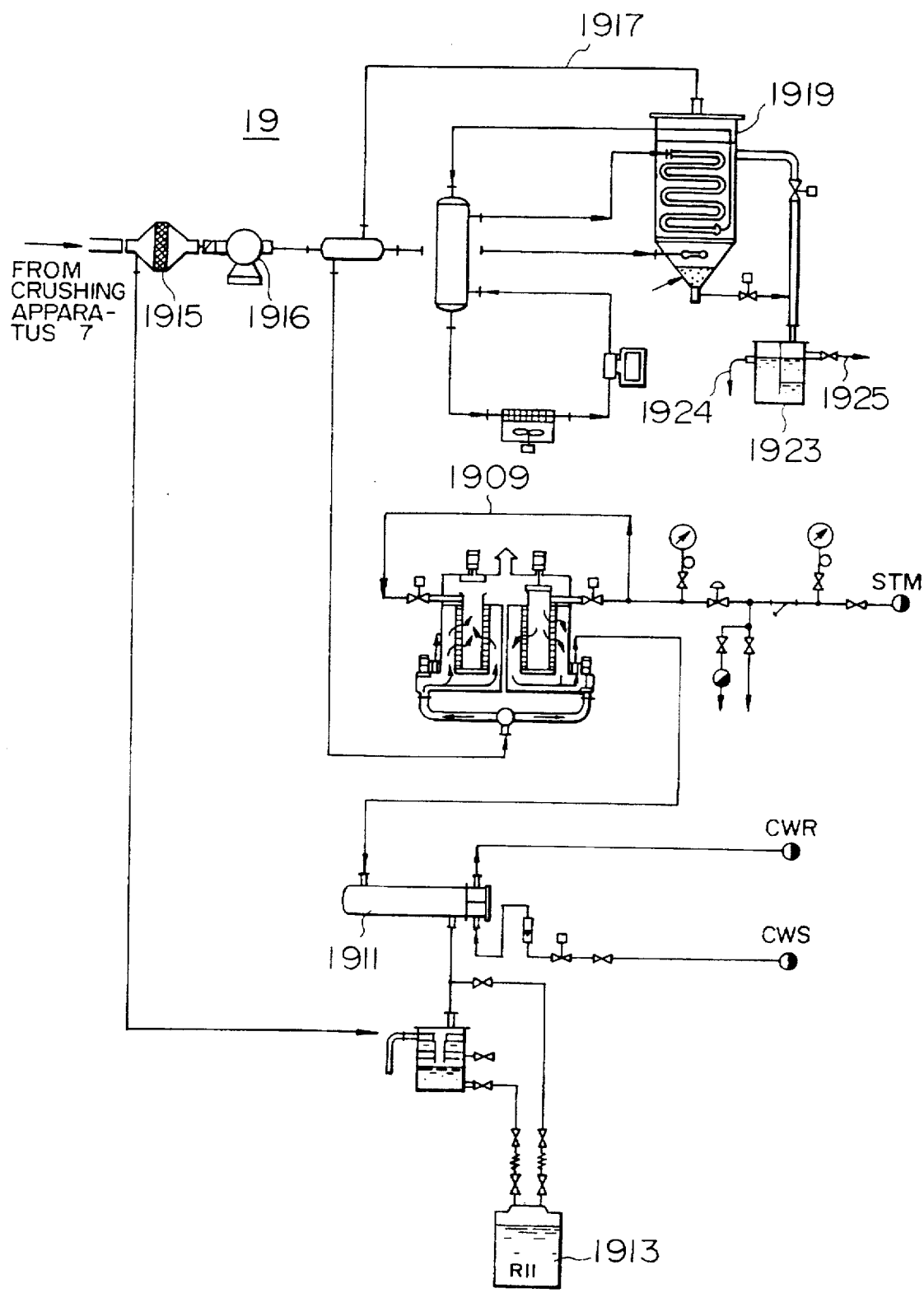

Metal bulk such as a compressor, motor or a clutch, springed out by the springing crusher 707, is sent to a metal bulk crushing apparatus 16 shown in FIG. 17, so as to be crushed by the apparatus 16. The metal bulk crushing apparatus 16 has a cooling device 17 which cools the metal bulk down to a temperature below embrittlement temperature of ferrous metals by using a cooling medium 1604 such as liquefied air. The cooled metal bulk is then crushed by a crusher 18, whereby ferrous metals are crushed into fine fragments. The fine fragments of ferrous metals are sent to a metal sorting apparatus 9 shown in FIG. 19 by means of a conveyor 1605 made of stainless steel or aluminum. The cooling medium which has been gasified as a result of cooling of the metal bulk in the cooling device 17 is used as a cold gas 1602, e.g., as a cooling cold heat source for the foaming agent collecting apparatus 19 and the plastics sorting apparatus 12.

The fragments of waste article introduced into the metal sorting apparatus 9 is sorted into three groups: namely, non-ferrous metals 912, ferrous metals 914 and other matters 913, through two stages of sorting performed by a magnetic sorter 911 which employs a rotary magnet for generating electric eddy currents. The other matters or residue 913 is screened by a screen 916 so that copper wires 917 which may still exist in the residue are collected and glasses 919 and other matters are separated by a sieve 918 having a mesh size between abut 5 and 10 mm. The glass and other matters 919 sieved through the sieve are forwarded as indicated by an arrow 920 for a processing such as sintering. The residue left on the sieve is substantially plastics. These plastics are then forwarded to a plastics sorting apparatus 12 shown in FIG. 19.

The waste fragments mainly composed of plastics and received in the plastic sorting apparatus 12 are introduced into a cold chamber 1211. The cold gas 1602 from the metal bulk crushing apparatus 16 shown in FIG. 17 is introduced into the cold chamber 1212 after a temperature regulation by a temperature regulator 1211, so as to cool the waste fragments 907 down to a very low temperature of −20° C. to −40° C. The gas is again introduced to the temperature regulator 1211 by means of a blower 1205. The waste cooled in the cold chamber is crushed by a sorting crusher 14. The fragments crushed and separated by the sorting crusher 14 are roughly classified by a sieve type separator 15. Consequently, a hopper 1208 disposed beneath the sieve receives plastics fragments rich in vinyl chloride. The fragments received in the hopper 1208, however, still contain plastics which are other than vinyl chloride and which are reusable. An aqueous separator, i.e., a specific gravity separator denoted by 1209, is employed for the purpose of efficient collection of such reusable plastics and sorting of the thus collected plastics. The reference specific gravity liquid used in the aqueous separator 1209 is progressively contaminated during the use. Therefore, a specific gravity liquid administration apparatus 1216 is used for controlling the specific gravity of this liquid.

Figure 16:
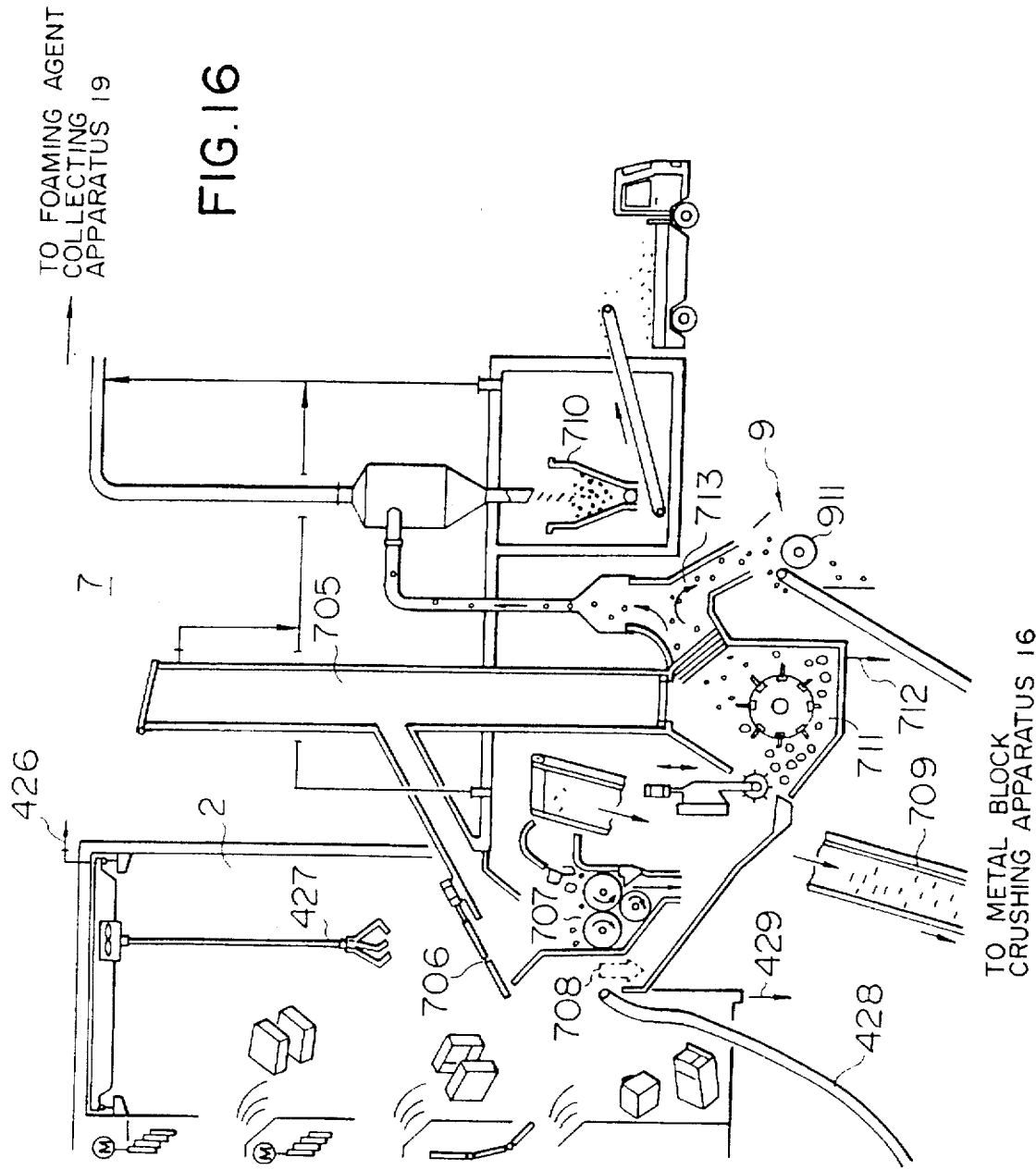

The foaming agent, which has been separated from the foamed polyurethane resin separated by the windage sorter 713 shown in FIG. 16 is sent by a blower 1916 into the foaming agent collecting apparatus 19 through a filter 1915, together with the foaming agents collected in the springing crusher 707 and the shredder 711. The foaming agent collecting apparatus 19 has a cold tank 1919 which liquefies the foaming agent by utilizing latent heat carried away when the agent itself is evaporated. Then, the liquefied foaming agent is made to pass through a water separator 1923 where water is removed from the foaming agent, whereby flon 1925 is collected. The foaming agent rich in air is made to shut at a point upstream of the cold tank 1919 and is adsorbed by activated carbon of an adsorption device 1909 as in the preceding embodiment. The foaming agent adsorbed on the activated carbon is released by application of heat and is liquefied through a cooler 1911 so as to be collected as liquefied foaming agent 1913.

In this embodiment, the plastic sorting apparatus 12 and the foaming agent collecting apparatus 19 employ independent cold heat sources. The arrangement, however, may be such that the cold heat 1602 wasted in the metal bulk crushing apparatus 16 is commonly used as the cold heat source both by the plastics sorting apparatus 12 and the foaming agent collecting apparatus 19.

Preferred embodiments of the waste disposal system of the present invention, capable of conducting overall treatments, have been described. It is to be understood, however, that various components of the described embodiments can be freely combined or replaced with each other and that the invention does not exclude the use of only a part of each system. For instance, it is possible to obtain a disposal system capable of performing a through process for sorting and disposing plastics, which hitherto has not been conducted, by combining the plastic sorting apparatus 12 with other components such as the feeding apparatus 2, crushing apparatus 7 and the metal sorting apparatus 9. A system also can be composed of the feeding apparatus 2, crushing apparatus 7 and the metal sorting apparatus 9. It is also possible to form an overall industrial waste disposal system by adding the plastic sorting apparatus 12 to the system composed of the feeding apparatus 2, crushing apparatus 7 and the metal sorting apparatus 9, with the upstream or downstream end of the feeding apparatus 2 being connected to the pre-treatment apparatus 3 which has at least one of the large-size glass separating means 5, refrigerant collecting means 4 and the metal bulk separating means 6. Provision of a low-temperature crushing apparatus for crushing metal bulks, in parallel with each of the systems described, is effective in reducing power required for crushing metal bulks and in prolonging the life of the crushing apparatus.

It is also possible to form a system having the feeding apparatus 2, crushing apparatus 7 and the metal sorting apparatus 9, with or without addition of the plastics sorting apparatus, wherein the light-weight article sorting apparatus 8 is connected to the downstream end of the crushing apparatus 7, with the foaming agent collecting apparatus connecting in a line shunting from the light-weight article separating apparatus so that collection of foaming agent is performed in parallel with the main route.

Figure 21:
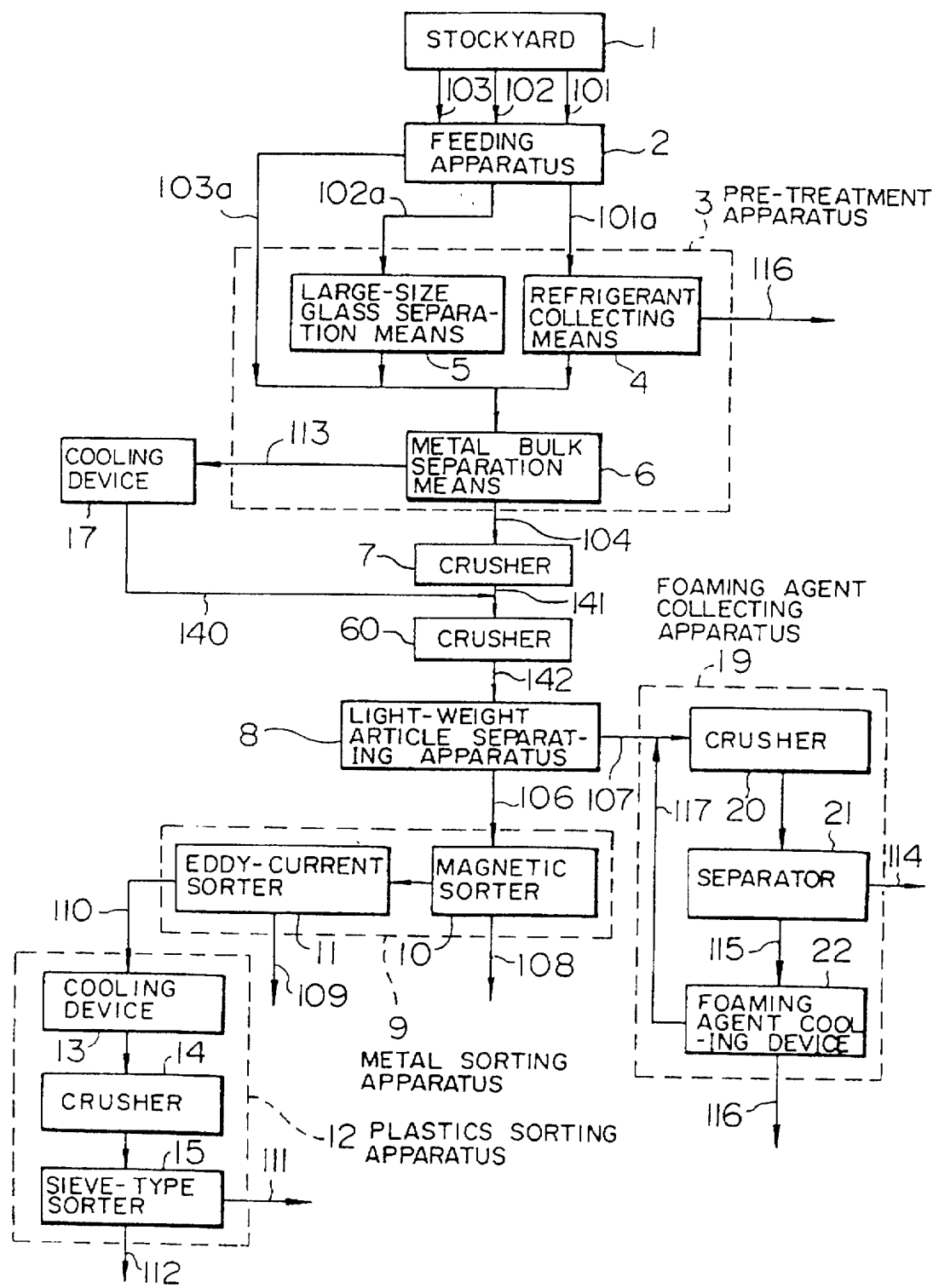
FIG. 21 is a block diagram similar to FIG. 1 but illustrates a further embodiment of the waste disposal system according to the present invention.

FIG. 21 shows a further embodiment of the system of the present invention. This embodiment is generally similar to the embodiment shown in FIG. 1 but is different therefrom in that crushers are provided in two stages. More specifically, metal bulk such as motors and compressors are separated by metal bulk separation means 6 from the rest of waste articles and fed therefrom to a cooling device 17. The waste articles separated from the metal bulk are fed from the metal bulk separation means 6 to a first stage crusher 7, as indicated by an arrow 104, and are crushed into fragments which are then fed to a second stage crusher 60, as indicated by an arrow 141. The metal bulk such as motor and compressors fed to the cooling device 17 is cooled therein by, for example, liquefied nitrogen, and then fed to the second stage crusher 60. The cooled metal bult is easily crushable and crushed by the second stage crusher 60 together with the fragments from the first stage crusher 7. The waste crushed by the second stage crusher 60 is then fed to a light-weight article separating apparatus 8, as indicated by an arrow 142, so as to be processed as in the embodiment shown in FIG. 1. It is to be understood, however, that the light-weight article separating apparatus 8 is essential only in the case where the waste articles include those containing foamed materials, such as refrigerators. In other words, if the waste articles to be disposed by the system of the invention do not include foamed plastic members, the waste crushed by the second stage crusher 60 may be fed to a metal sorting apparatus 9 directly, i.e., bypassing the light-weight article separating apparatus 8. The other elements of the embodiment shown in FIG. 21 are identical with the corresponding elements of the embodiment shown in FIG. 1.

Figure 22:
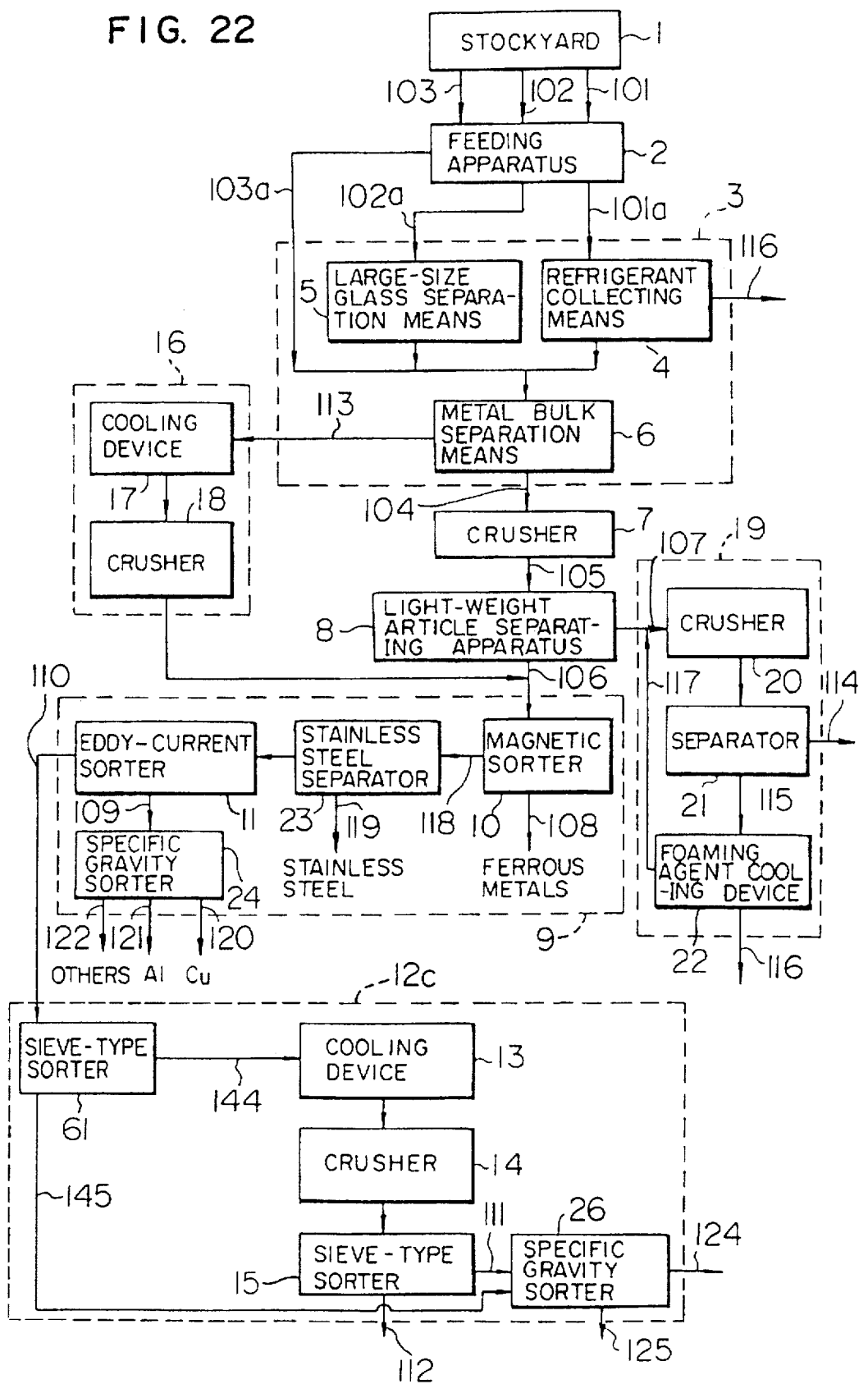
FIG. 22 is a block diagram similar to FIG. 2 but illustrates a still further embodiment of the waste disposal system according to the present invention.

The embodiment shown in FIG. 22 is generally similar to the embodiment shown in FIG. 22 but employs a modified plastic sorting apparatus 12c which has two sieve-type sorters 61 and 15. More specifically, crushed waste fragments sorted by the eddy-current sorter 11 and mainly consisting of plastic fragments are fed from the sorter 11 to a first stage sieve-type sorter 61, as indicated by an arrow 110, and sorted into two sorts of plastic fragments. The plastic fragments of one of the two sorts are of relatively smaller size (smaller than 30 mm square, for example) and fed directly to a specific gravity sorter 26 disposed at the end of the processing line in the plastic sorting apparatus 12c, while the plastic fragments of the other of the two sorts are of relatively larger size (larger than 30 mm square, for example) and fed to and processed by a cooling device 13, a crusher 14 and the second stage sieve-type sorter 15, as in the embodiment shown in FIG. 2, and finally to the specific gravity sorter 26 which is operative to sort the plastic fragments into at least two kinds of plastic waste, namely, polyvinyl chloride type plastic waste 124 and non-polyvinyl chloride type plastic waste 125.

Water is employed as a specific gravity liquid utilized in the specific gravity sorter 26 and caused to flow from an end of a vessel toward an opposed end thereof. Plastic fragments are supplied into the water. An experimental test was conducted in such a manner as to remove air bubbles from the surfaces of the plastic fragments fed into the water. It has been found that fragments of ployvinyl chloride sink in the water at an upstream point of the path of the water flow in the vessel, polystyrene fragments sink at a downstream point of the path of the water flow and fragments of polyethylene and polypropyrene float on the water surface.

It is to be understood that, although each of the embodiments of the invention described above includes the stockyard 1, the stockyard is not essential for the present invention.

Figure 23:
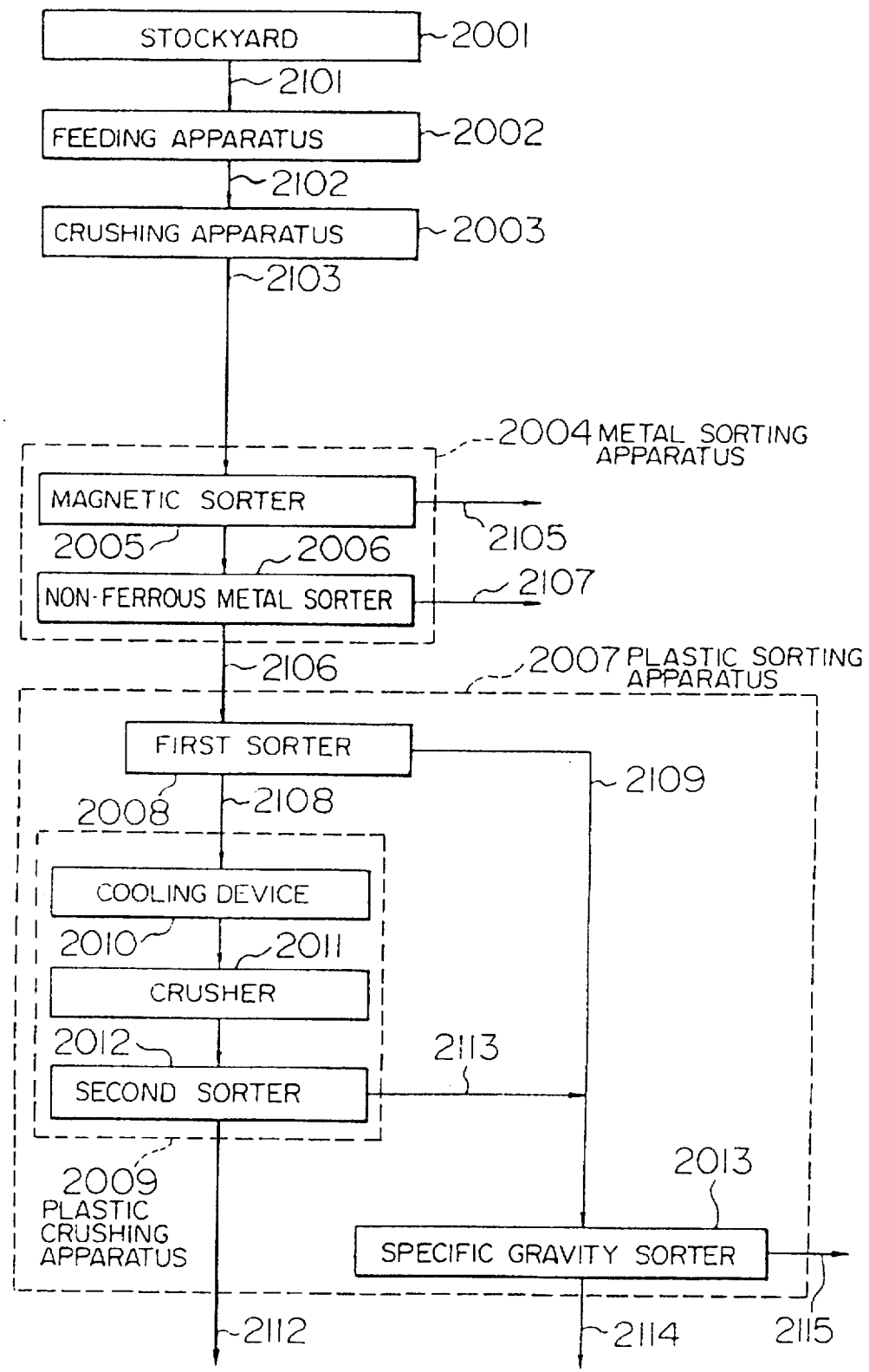
FIG. 23 is a block diagram of a still further embodiment of the waste disposal system according to the present invention.

FIG. 23 illustrates a still further embodiment of the waste disposal system of the present invention. This embodiment comprises a stockyard 2001, a feeding apparatus 2002, a crushing apparatus 2003 formed by a single or a plurality of crushers (not shown), a metal sorting apparatus 2004 formed by a magnetic sorter 2005 and a non-ferrous metal sorter 2006 which may be an eddy-current sorter or a specific gravity sorter, and a plastic sorting apparatus 2007 which comprises a first sorter 2008, a cryogenic plastic crushing apparatus 2009 and a specific gravity sorter 2013. The plastic crushing apparatus 2009 comprises a cooling device 2010, a crusher 2011 and a second sorter 2012.

Waste household electric machines, such as refrigerators, air-conditioners, T.V. sets and washing machines, which have been collected by collecting trucks are stored in the stockyard 1 and are then fed therefrom to the crushing apparatus 2003 by the feeding apparatus 2002, as indicated by arrows 2101 and 2102. The single or a plurality of crushers which form the crushing apparatus 2003 crush the waste articles into fragments each of a size of approximately from 50 to 100 mm. The thus crushed fragments are also separated from each other. It is advantageous for the crushing apparatus 2003 to be formed by a plurality of stages of crushers in the case where the crushing apparatus is operated to crush a waste article, such as refrigerator, in which various kinds of materials are secured together by bonding or the like to form a composite structure. The fragments thus crushed and separated from each other by the crushing apparatus 2003 are then fed to the metal sorting apparatus 2004, as indicated by an arrow 2103. In the metal sorting apparatus 2004, fragments of ferrous metals are separated by the magnetic sorter 2005 from the fragments of other materials and are collected, as indicated by an arrow 2105. By the non-ferrous metal sorter 2006, fragments of non-ferrous metals such as copper and aluminium are then separated by eddy-current or specific gravity and are collected as non-ferrous metals, as indicated by an arrow 2107.

The rest of the waste materials consists mainly of plastics materials and is then fed to the plastic sorting apparatus 2007, as indicated by an arrow 2106. The first sorter 2008 of the apparatus 2007 sorts the waste materials into two kinds of fragments; the first kind comprising fragments of relatively larger size and the second kind comprising fragments of relatively smaller size. The first kind of plastic fragments of relatively larger size is separated by the first sorter 2008 from the second kind of plastic fragments of relatively smaller size and is then fed to the plastic crushing apparatus 2009 which is designed to selectively crush and sort waste plastic materials depending upon difference in cold embrittlement of plastic materials. The first sorter 2008 is provided upstream of the plastic crushing apparatus 2009 so as to prevent the plastic crushing apparatus 2009 from being supplied with already crushed waste plastic fragments of smaller sizes which would otherwise lead to requirement for an increased size of the plastic crushing apparatus 2009.

The second kind of plastic fragments of relatively smaller size thus separated from the first kind is fed to the specific gravity sorter 2013, as indicated by an arrow 2109.

The waste plastic fragments of relatively larger size are cooled by the cooling device 2010 of the plastic crushing apparatus 2009 down to a temperature level of from 0° to 6° C. and then fed to the crusher 2011 in which the cooled plastic fragments are crushed by impact forces into small fragments. It is to be noted that vinylchloride type plastics have higher cold embrittlement points and are more finely crushed than plastics of other types.

Then, the waste plastic material thus crushed by the crusher 2011 are fed to the second sorter 2012 and sorted thereby into first and second kinds of plastic fragments. The first kind of fragments consists mainly of finely crushed fragments of vinylchloride type plastic material and thus is separated from the second kind of plastic fragments, as indicated by an arrow 2113. The second kind of plastic fragments includes a very small amount of vinylchloride-based fragments and consists of fragments of relatively larger size which are then collected as reusable plastic material, as indicated by an arrow 2112.

However, the waste plastic fragments collected as indicated by the arrow 2113 still include fragments of reusable plastics other than vinylchloride type plastics. In addition, the smaller fragments 2109 separated by the first sorter 2008 also include fragments of reusable plastics other than vinylchloride type plastics. The specific gravity sorter 2013 is provided for the purpose of collecting such reusable plastics so as to increase the amount of the reusable plastic materials to be collected. The vinylchloride type plastics have specific gravities of as large as about 1.3 and thus sink in a specific gravity liquid employed in the specific gravity sorter 2013 and are collected as a non-reusable plastic material, as indicated by an arrow 2115. Fragments of plastics other than vinylchloride type plastics float on the surface of the specific gravity liquid in the sorter 2013 and are collected as reusable plastic materials, as indicated by an arrow 2114, to improve the percentage of the collection of the reusable plastic materials.

Figure 24:
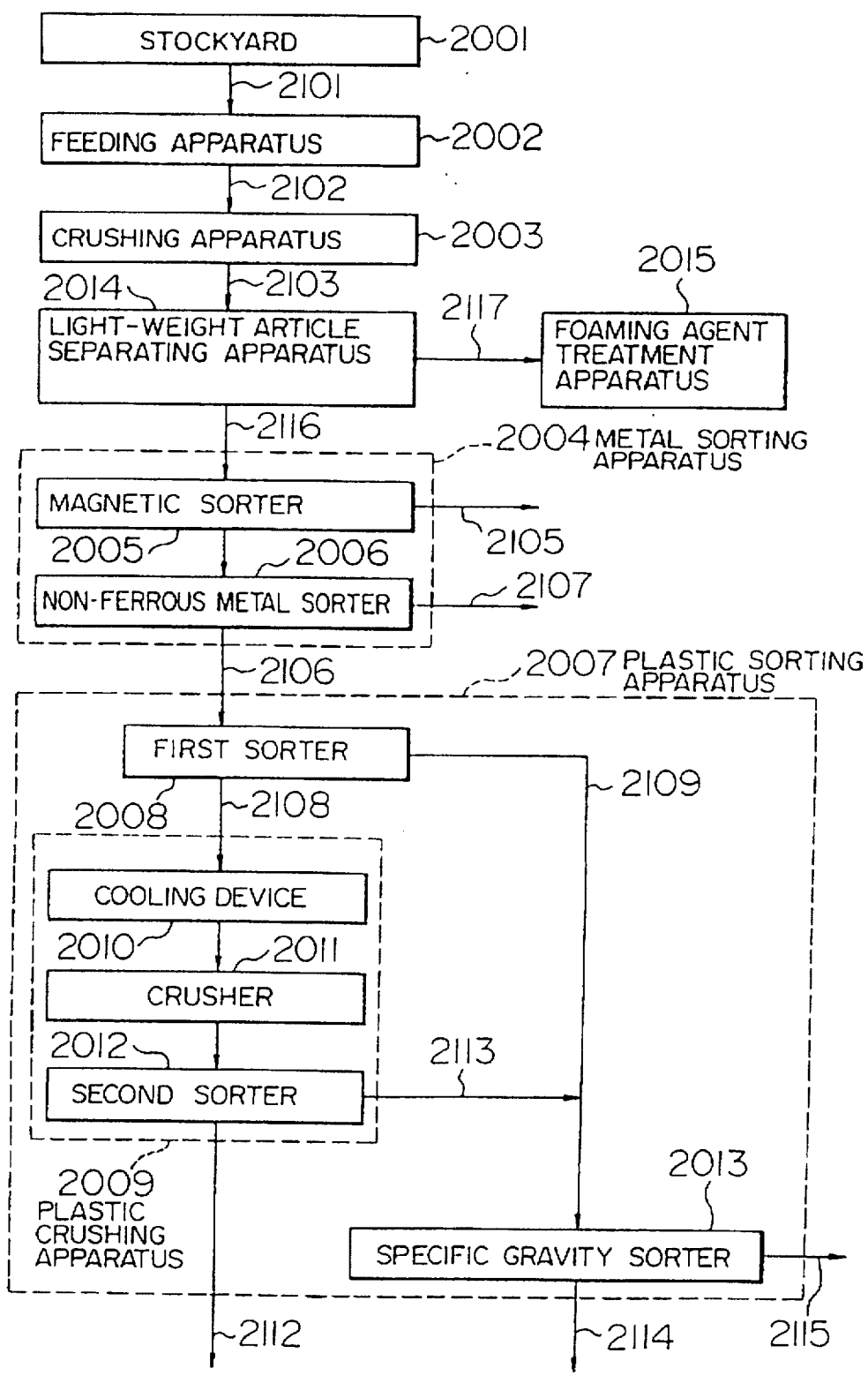
FIG. 24 is a block diagram of a still further embodiment of the waste disposal system according to the present invention.

FIG. 24 shows a still further embodiment of the waste disposal system of the present invention. This embodiment is improved to eliminate a shortcoming that metal and plastic sorting performances of the embodiment shown in FIG. 23 are adversely influenced by a large amount of foaming agent contained in waste articles such as waste refrigerators. In the improved embodiment shown in FIG. 24, a light-weight article separating apparatus 2014 is disposed between the crushing apparatus 2003 and the metal sorting apparatus 2004. The light-weight article separating apparatus 2014 may advantageously comprise an air-force type sorter operative to direct jets of air to waste articles crushed by the crushing apparatus 2003 so that lighter fragments of foamed materials are blown away from heavier fragments.

Alternatively, the light-weight article separating apparatus 2014 may comprise an inclined oscillation conveyor to separate waste articles such that lighter fragments of foamed materials are collected at the upper end of the inclined conveyor while heavier fragments are collected at the lower end of the conveyor. Another alternative may comprise a combination of the air type sorter and the inclined oscillation conveyor. Thus, the waste articles crushed by the crushing apparatus 2003 into independent fragments of suitable sizes are fed into the light-weight article separating apparatus 2014, as indicated by an arrow 2103.

The light-weight article separating apparatus 2014 separates foaming agent from the waste material fed thereto as indicated by the arrow 2103 and feeds the foaming agent to a foaming agent treatment apparatus 2015, as indicated by an arrow 2117, for further treatment thereof.

On the other hand, the fragments of the waste articles from which the foaming agent has been removed by the light-weight article separating apparatus are fed to the metal sorting apparatus 2004, as indicated by an arrow 2116. Thereafter, the waste materials are processed as in the preceding embodiment shown in FIG. 23. It is to be noted that the embodiment shown in FIG. 24 provides improved metal sorting and plastic sorting performances.

Figure 25:
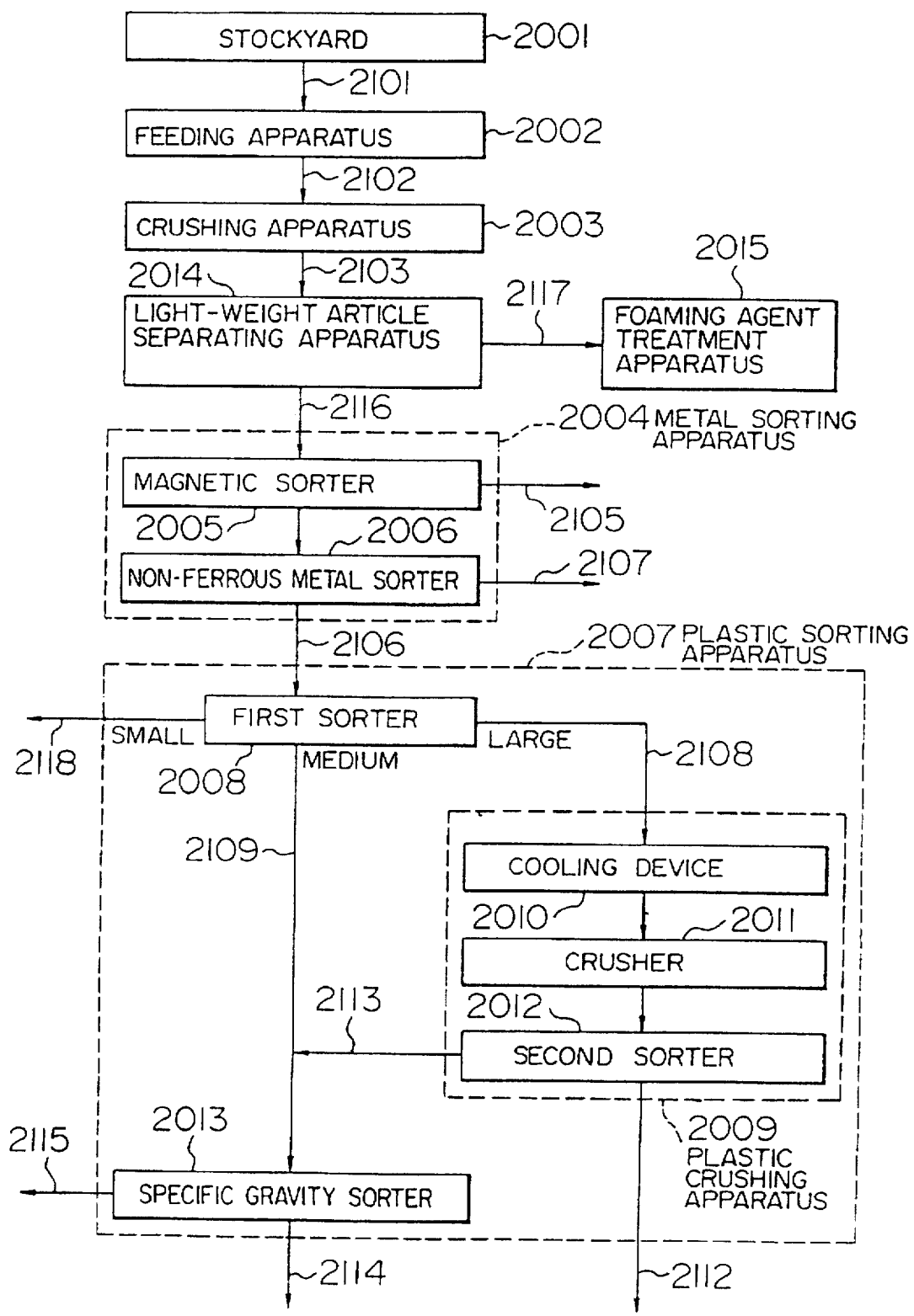
FIG. 25 is a block diagram of a still further embodiment of the waste disposal system according to the present invention.

FIG. 25 shows a still further embodiment of the invention. In each of the embodiments shown in FIGS. 23 and 24, the fragments of waste materials are sorted into two classes, i.e., a first class of fragments of relatively larger sizes and a second class of fragments of relatively smaller sizes. Thus, foreign particles such as dirt, dust, sand particles, crushed glass particles and the like which have been adhered to waste articles left outside houses are introduced into the specific gravitity sorter 2013 in which the foreign particles are collected together with the fragments of vinylchloride type plastics. Such foreign particles would spoil the specific gravity liquid to lower the performance of the specific gravity sorter 2013 with a resultant disadvantage that the specific gravity liquid cleaning apparatus (not shown) is required to be of an increased size to increase the cost of the installation of the system.

The embodiment shown in FIG. 25 is intended to avoid such problem. For this purpose, the first sorter 2008 of the plastic sorting apparatus 2007 is designed to sort the waste plastic fragments fed into the plastic sorting apparatus into three classes of fragments, i.e., fragments of larger, medium and smaller sizes. The foreign particles such as dirt, dust, sand particles, crushed glass particles and the like are sorted and collected as the smaller fragment class, as indicated by an arrow 2118. Fragments sorted as the larger fragment class 2108 are fed to the plastic crushing apparatus 2009 in which the fragments are cooled by the cooling device 2010, crushed by the crusher 2011 and then sorted by the second sorter 2012 into a first plastic waste 2113 mainly consisting of vinylchloride type plastics and a second plastic waste 2112 which contains little amount of vinylchloride type plastics.

On the other hand, the fragments sorted by the first sorter 2008 as the medium fragment class 2109 are fed, together with the first plastic waste 2113 sorted by the second sorter 2012 and mainly consisting of vinylchloride type plastics, into the specific gravity sorter 2013 in which fragments of vinylchloride type plastics are again separated from fragments of other materials. Accordingly, the of amount of foreign particles introduced into the specific gravity sorter 2013 is greatly reduced to keep its intended performance for a long time and minimize the size of the specific gravity liquid cleaning apparatus (not shown).

Figure 26:
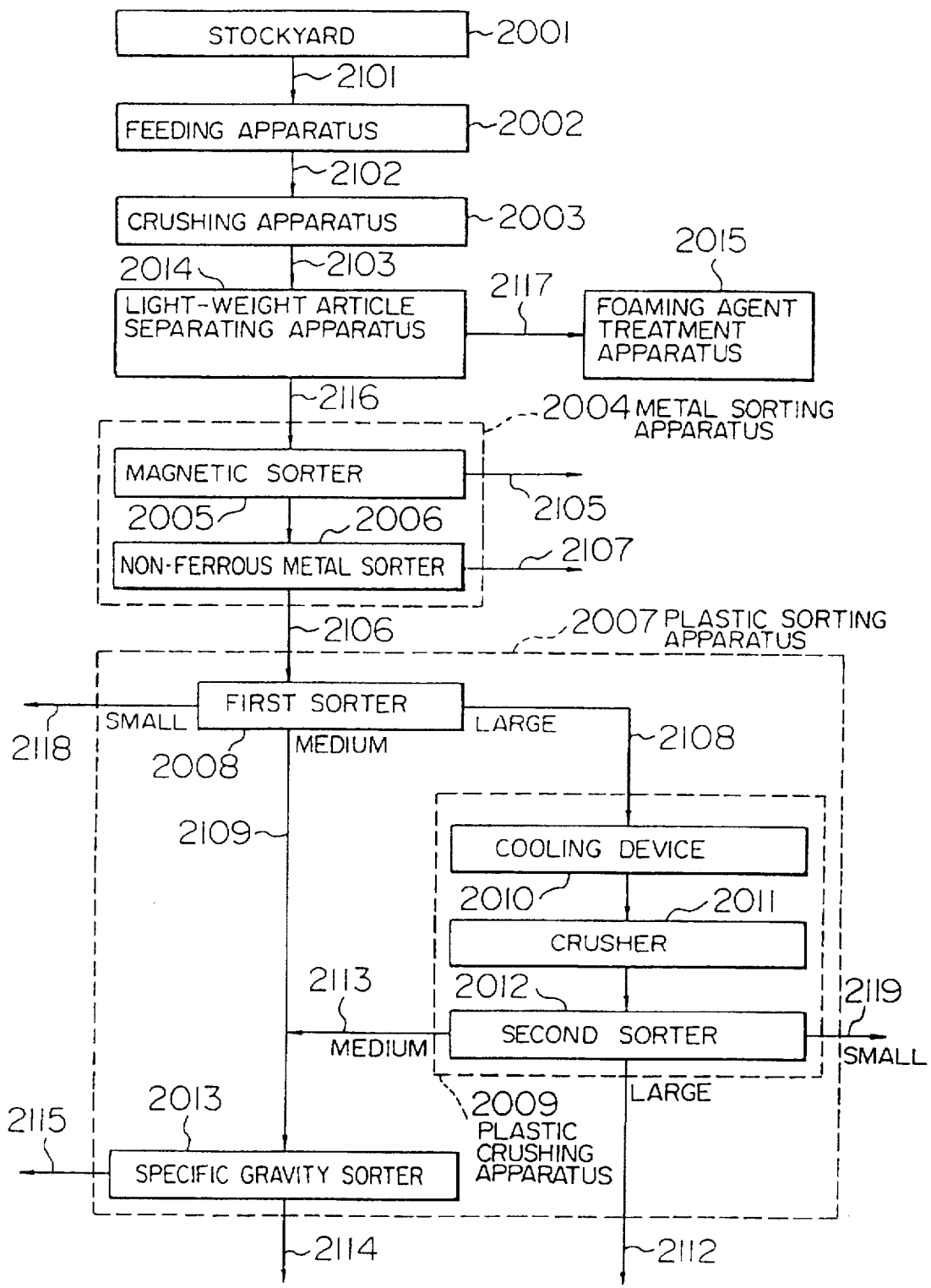
FIG. 26 is a block diagram of a still further embodiment of the waste disposal system according to the present invention.

The embodiment shown in FIG. 26 is characterized in that the plastic crushing apparatus 2009 is designed to remove fine and powdered plastic particles 2119 from plastic waste 2113 to be fed to the specific gravity sorter 2013. If the fine and powdered plastic particles 2119 are introduced into the specific gravity sorter 2013 and scattered in the specific gravity liquid to form a colloid, the apparent specific gravity of the specific gravity liquid is varied to lower the performance of the specific gravity sorter 2013. In addition, the fine powdered plastic particles 2119 include fine foreign matters such as dirt, dust and the like which have been adhered to plastic fragments and have not been removed by the first sorter 2008. Such foreign matters also lower the performance of the specific gravity sorter 2013. These problems are avoided by the embodiment shown in FIG. 26.

For this purpose, the second sorter 2012 of the plastic crushing apparatus 2007 is structured to conduct sorting operation in a plurality of stages to remove the fine and powdered plastic particles 2119. A similar effect can also be obtained by providing an additional sorter upstream or downstream of the second sorter 2012.

The embodiment shown in FIG. 26 of the described structure is effective to sort waste plastic fragments with an improved precision as well as to assure easy maintenance of the specific gravity sorter 2013.

An example of a combined waste disposal plant to which the present invention is applied will now be described hereinunder with reference to FIGS. 27-31.

Figure 27:
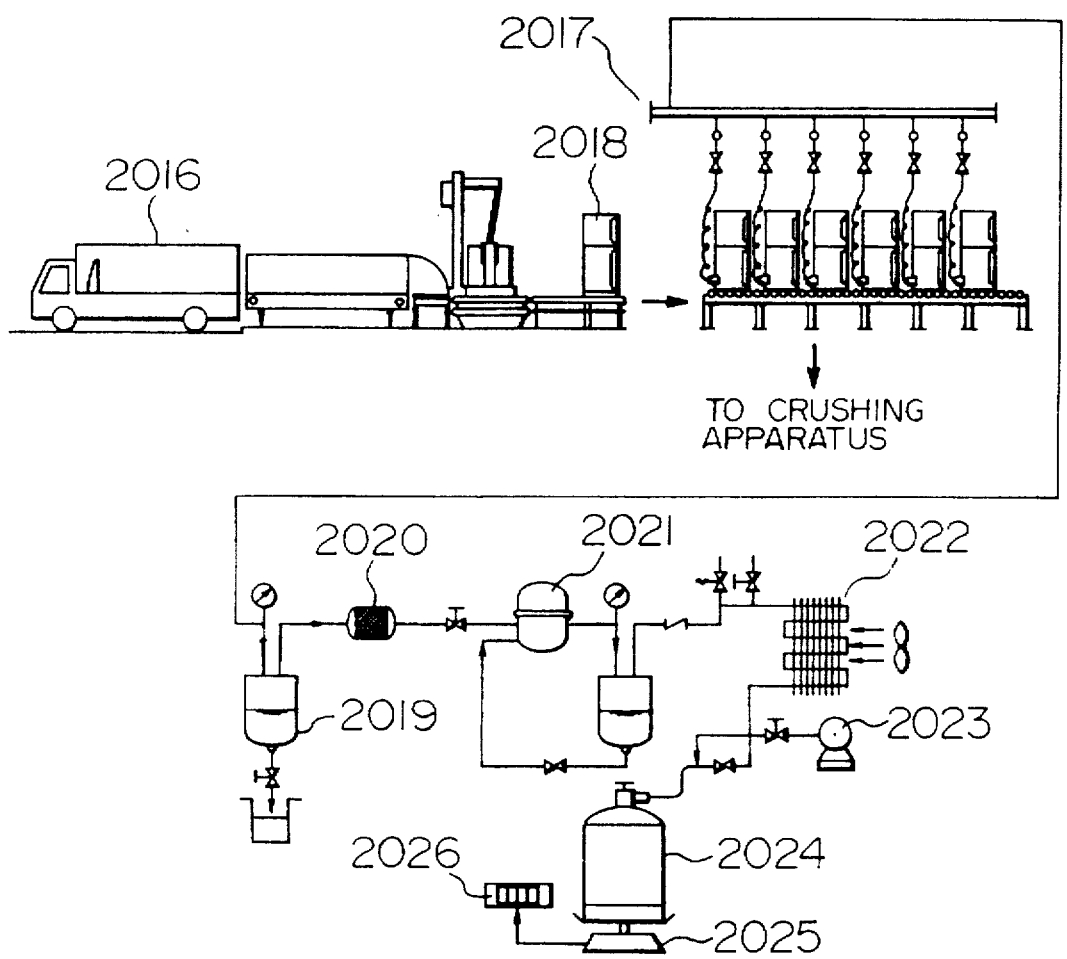
FIG. 27 is a schematic illustration of the construction of a pre-treatment apparatus of the waste disposal system of the invention.

FIG. 27 schematically illustrates a pre-treatment apparatus. A waste article shown as a refrigerator 2018 is transferred from a waste collecting truck 2016 to a refrigerant extracting and collecting unit 2017 in which chlorofluorocarbon (CFC) 12 (refrigerant usually called as "R-12") is extracted from the waste refrigerator 2018 and flows through an oil separator 2019 and a filter 2020 to a compressor 2021 by which the refrigerant is compressed and flows to a condenser 2022 in which the refrigerant is subjected to heat exchange so as to be cooled. Thereafter, the thus cooled refrigerant is caused to flow into a collecting container 2024 by the operation of a vacuum pump 2023. The container 2024 is placed on a weighing device 2025 which is provided with an indicator 2026 for indicating the amount of the refrigerant thus collected into the collecting container 2024. The refrigerator from which the refrigerant has been extracted is transferred to a crusher to be described with reference to FIG. 28.

Figure 28:
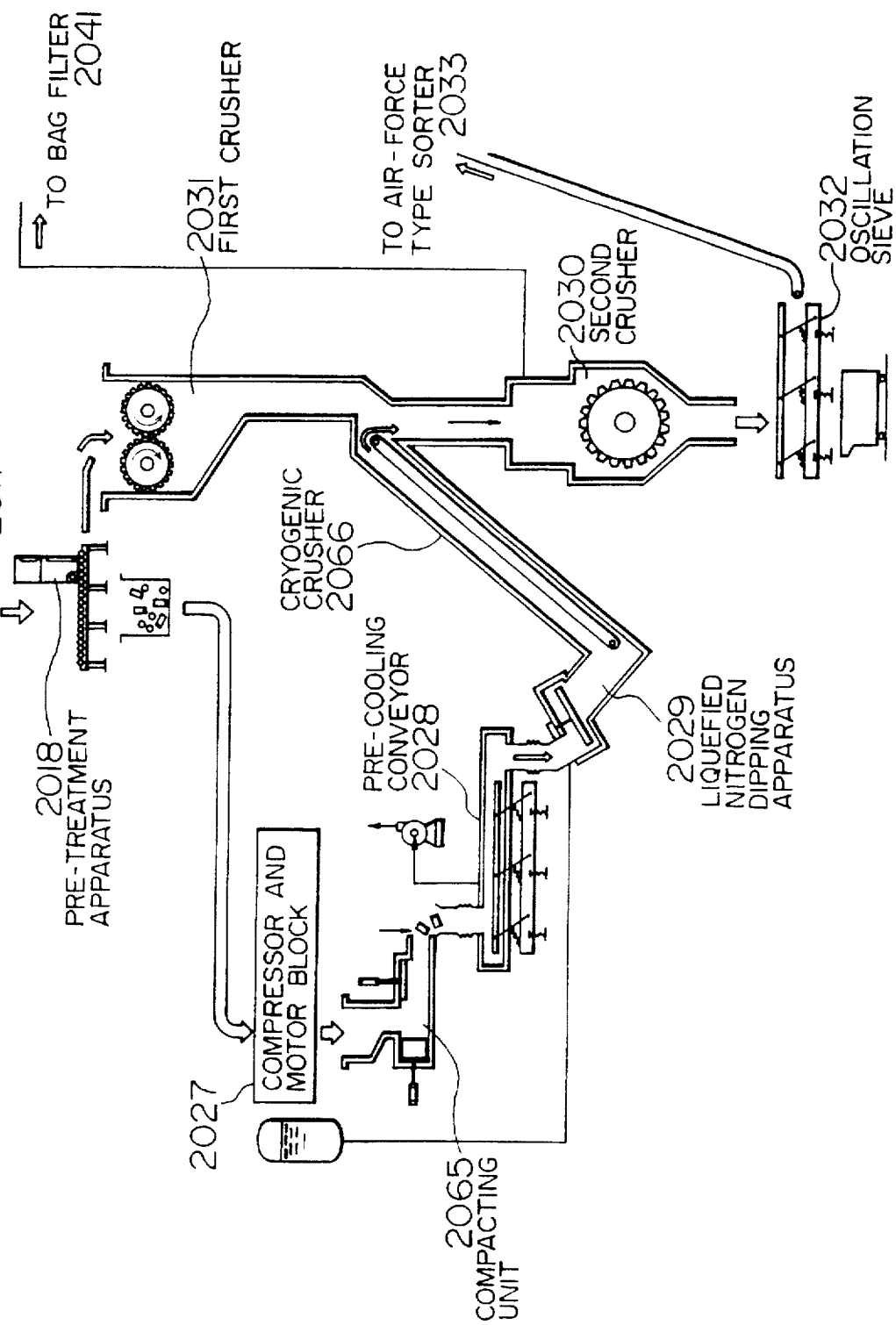
FIG. 28 is a schematic illustration of the construction of a two-staged crushing apparatus of the waste disposal system of the invention.

The process stage illustrated in FIG. 28 is to crush large-sized waste articles. The refrigerator 2018 from which the refrigerant has been removed by the refrigerant extracting and collecting unit 2017 shown in FIG. 27 is subjected to a pre-treatment in which the compressor and motor of the refrigerator are separated from the housing thereof and are then transferred to a compressor and motor block 2027 and is subjected to a compacting unit 2065 for compacting the compressor and motor to reduce the volumes of vacant spaces therein to assure that the compressor and motor can be easily cooled. The compressor and motor are then dropped onto a pre-cooling conveyor 2028 which is followed by a cryogenic crushing apparatus 2066 for crushing the metal blocks at a temperature of as low as minus one hundred and some tens °C. created by a liquid-cooling or an air-cooling. The compacting operation conducted by the compacting unit 2065 is effective to reduce the amount of the liquefied refrigerant (requefied nitrogen) required for the liquid-cooling and to improve the heat transfer in the metal blocks for thereby speeding up the cooling thereof. The air-cooling is conducted by spraying liquefied nitrogen, for example. In the embodiment shown in FIG. 28, the compacted motor and compressor blocks are cooled by liquid-cooling and are fed from the pre-cooling conveyor 2028 to a liquefied nitrogen dipping apparatus 2029 by which the metal blocks are cooled and then transferred to a cryogenic crusher 2066.

On the other hand, the housing of the refrigerator 2018 from which the motor and compressor have been removed is fed to a first crusher 2031 for crushing the housing by shearing into fragments each of a size of as large as 100 to 200 mm square.

The fragments crushed by the first crusher 2031 and the cryogenic crusher 2066 are then introduced into a second crusher 2030 in which the fragments from the cryogenic crusher 2066 are impacted to break bonded portions of composite materials and to facilitate easy separation of electric wires of the motor from the core thereof and the fragments from the first crusher 2031 are also processed to assure separation of polyurethane fragments from metal fragments. Fragments thus crushed by the second crusher 2030 are downwardly discharged therefrom onto an oscillation sieve 2032 by which fine particles, such as crushed glass, plastics and wood, of a size of as small as 1–5 mm are separated from other fragments which are then transferred to an air-force type sorter 2033 shown in FIG. 29.

Figure 29:
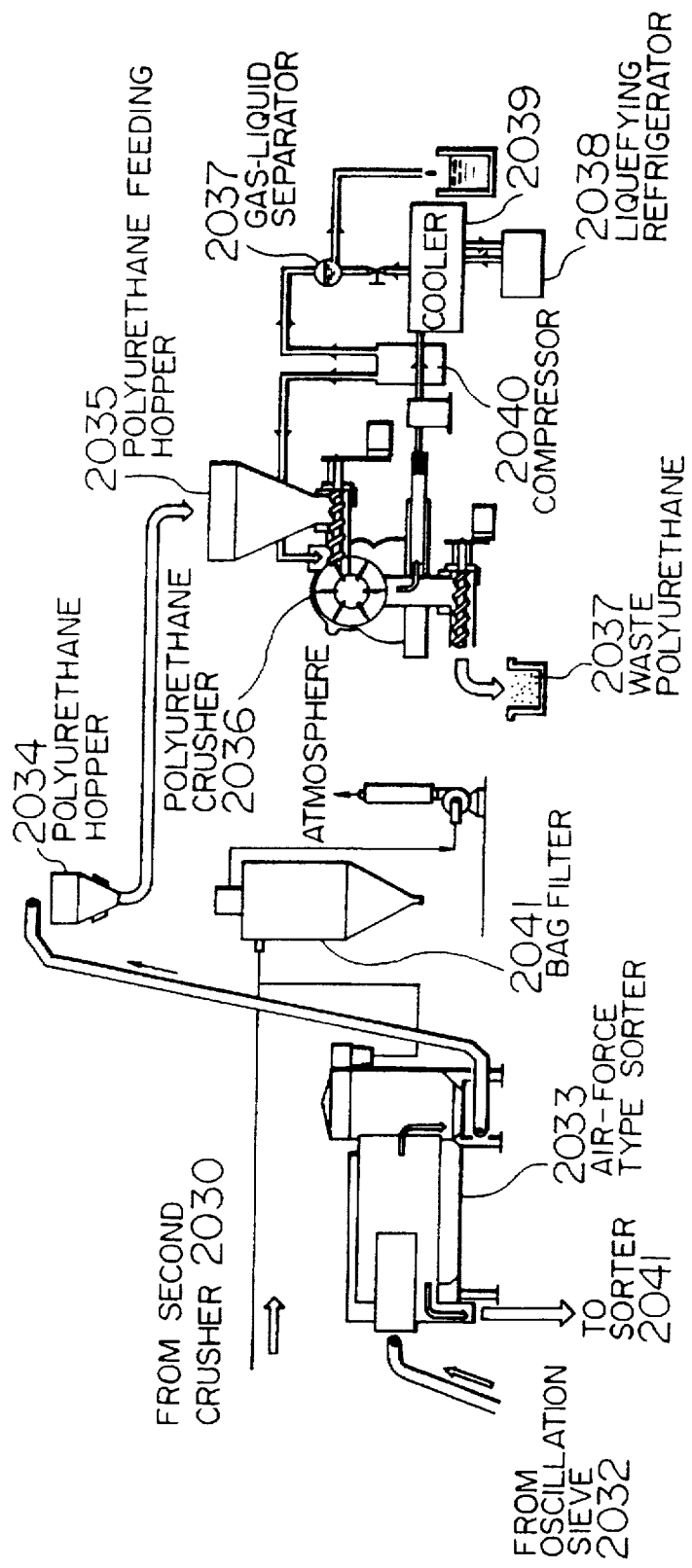
FIG. 29 is a schematic illustration of the construction of a polyurethane treatment apparatus of the waste disposal system of the invention.
Figure 31:
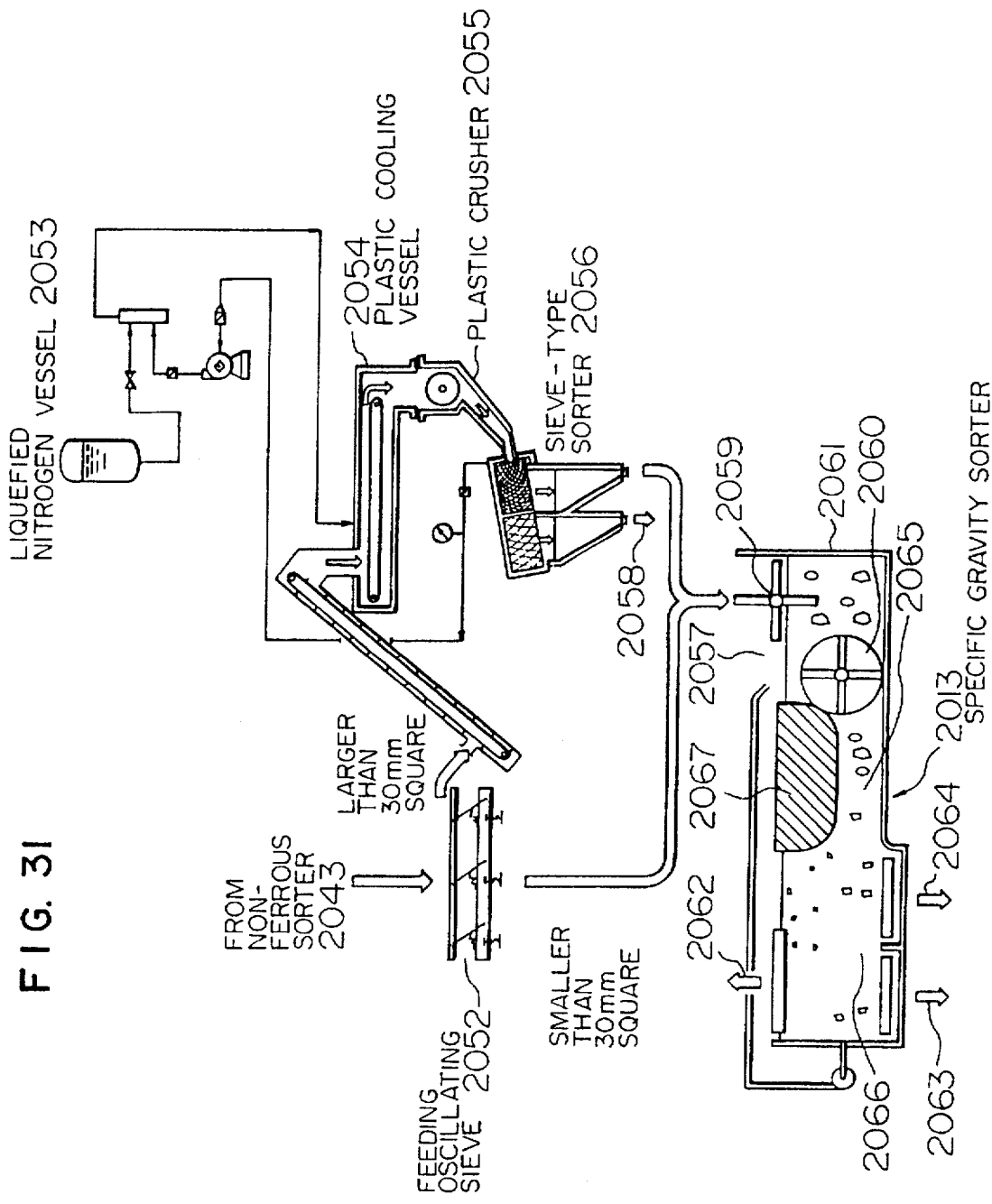
FIG. 31 is a schematic illustration of the construction of a plastic sorting apparatus of the waste disposal system of the present invention.

The upper portion of the second crusher 2030 is connected by a pipe line to an bag filter shown in FIG. 29.

The apparatus shown in FIG. 29 is to collect CFC 11 (usually called as "R-11") used as a foaming agent for foamed polyurethane. The waste fragments from the oscillation sieve 2032 are introduced into the air-force type sorter 2033 in which fragments of foamed polyurethane are separated from fragments of metals and other plastics which are then fed to a first magnetic sorter 2041 of a further sorting apparatus shown in FIG. 30. Gas is produced in the air-force type sorter 2033 and introduced into the bag filter 2041 together with the gas from the second crusher 2030 shown in FIG. 28. If a small amount of harmful material such as CFC is included in the gas, such material is collected by adsorption in the filter 2041 so as not to be released into the environment and only the reminder of the gas is released into the atmosphere.

On the other hand, the fragments of foamed polyurethane separated from other fragments in the air-force type sorter 2033 are transferred through a polyurethane hopper 2034 to a polyurethane feeding hopper 2035 which crushes the polyurethane fragments into particles which are then collected as waste polyurethane 2037. In the crushing operation of the polyurethane crusher 2036, the forming agent, R-11, is removed from the polyurethane fragments and is circulated through a compressor 2040, a cooler 2039, a liquefying refrigerator 2038 and a gas-liquid separator 2037 and condensed in the course of this circulation.

The waste metallic and plastic fragments separated from the polyurethane fragments in the air-force type sorter 2033 are fed to a further sorting apparatus shown in FIG. 30, in which the fragments are first sorted by a first magnetic sorter 2041 which roughly sorts the waste fragments to remove ferrous fragments which are collected as ferrous waste 2049. The waste fragments which have passed through the first magnetic sorter 2041 are then fed to a second magnetic sorter 2042 by which the fragments are finely sorted to remove ferrous pieces which are collected as ferrous waste 2050. The waste fragments which have passed through the second magnetic sorter 2042 are fed to a first non-ferrous sorter 2043 by which plastic fragments are separated and transferred to a feeding oscillating sieve 2052 shown in FIG. 31 so as to be subjected to sorting by the specific gravity sorter 2013.

The rest of the waste fragments which has passed through the first non-ferrous sorter 2043 consists mainly of aluminium and copper pieces which are then finely sorted by a second non-ferrous sorter 2044 and collected as non-ferrous waste material 2051. The collected waste material 2051 may be subjected to a further sorting to sort aluminium particles and copper particles. Such further sorting may be conducted such that the waste aluminium and copper pieces are introduced into a specific gravity liquid formed by a colloid of powdered material so that the copper particles sink in the specific gravity liquid while the aluminium particles float on the liquid surface.

The waste plastic fragments fed from the second non-ferrous sorter 2044 to the feeding oscillating sieve 2052 (corresponding to the first sorter 2008 described before) are sorted thereby into first and second classes of plastic fragments. The first class consists of plastic fragments each of a size of larger than 30 mm square and is fed to a plastic cooling vessel 2054, whereas the second class consists of plastic fragments each of a size of less than 30 mm square and is fed to the specific gravity sorter 2013. The plastic cooling vessel 2054 is supplied with liquefied nitrogen from a liquefied nitrogen vessel 2053 to cool the plastic fragments of the first class. The cooled plastic fragments are then fed to a plastic crusher 2055 which crushes the plastic fragments by cryogenic crushing into crushed plastic pieces which are then subjected to a further sorting by a sieve-type sorter 2056 (corresponding to the second sorter 2012 described before). The nitrogen used for the treatment of the plastic fragments is returned from the sieve-type sorter 2056 to the liquefied nitrogen vessel 2053.

The sieve-type sorter 2056 is divided into upstream and downstream sieves. The downstream sieve collects waste plastic pieces of non-PVC (polyvinyl chloride) plastics 2058 such as polypropylene, polystyrene and ABS resin. The reminder of the plastic pieces is rich with PVC and fed, together with the plastic fragments of smaller than 30 mm square sorted by the feeding oscillating sieve 2052, into a plastic inlet 2057 of a vessel 2061 of the specific gravity sorter 2013.

The plastic inlet 2057 is provided with an agitating device 2059 which is operative to agitate the thus fed plastic pieces in the specific gravity liquid (in this case, water) to mix them together and then move the mixture to an air-bubble removing device 2060 which is operative to again agitate the plastic pieces in the water to remove from the plastic pieces air bubbles which have been adhered thereto. The vessel 2061 is further provided with a member 2067 so arranged as to cooperate with the bottom of the vessel 2061 to define a restricted passage 2065 through which the agitated plastic pieces are moved with the water to a next chamber 2066 in which lighter plastics 2062 such as polyethylene and polypropylene float on the surface of the water and heavier plastics sink in the water such that PVC 2064, which is easily sinkable, sinks in an upstream stage portion of the chamber 2066 and other plastics 2063 such as ABS resin and PS (polystyrene), which are not easily shakable, sink in a downstream stage portion of the chamber 2066. As such, the plastic pieces are sorted by the specific gravity sorter 2013 into those of substantially respective plastics.

As will be understood from the foregoing description, the present invention provides a waste disposal system which can efficiently treat almost all types of large-size waste articles and which can collect and recover materials of these articles, thus making it possible to reuse these materials, while contributing to preservation of natural resources. Furthermore, the present invention greatly reduces the volume of the fragments which are to be finally disposed of for reclaiming purpose, which well cope with the current problem in regard to restriction in the reclamation area.

It is also to be noted that the present invention does not substantially require burning step, which is advantageous from the view point of prevention of warming of the earth by carbon dioxide generated as a result of burning.

Furthermore, the present invention, unlike known waste disposal system, is capable of collecting flons which have been broadly used as refrigerants or as foaming agents, thus contributing greatly to preservation of global environment.

What is claimed is:

1. An apparatus for sorting plastic pieces by specific gravity sorting, said plastic pieces having sizes suited to the specific gravity sorting and comprising those of at least first, second and third kinds, said first kind of plastic pieces having a specific gravity smaller than that of water, said second kind of plastic pieces having a specific gravity greater than that of water, said third kind of plastic pieces having a specific gravity greater than that of water but smaller than the specific gravity of said second kind of plastic pieces, said apparatus including:

a vessel containing an amount of water and having an inlet for plastic pieces to be sorted;

means for introducing plastic pieces to be sorted into said vessel through said inlet;

air-bubble removing means positioned within the water contained in said vessel for removing air bubbles from the plastic pieces introduced into said vessel; and means for moving said plastic pieces with said water in said vessel to allow said second kind of plastic pieces to sink in said water at a first stage portion of said vessel and allow said third kind of plastic pieces to sink in said water at a second stage portion of said vessel downstream of said first stage portion, said first kind of said plastic pieces floating on the surface of said water and being moved by the movement of said water to a third stage portion of said vessel downstream of said second stage portion.

2. A plastic piece sorting apparatus according to claim 1, further including means disposed adjacent a first point of said vessel upstream of said first stage portion for agitating all of the plastic pieces to be sorted to cause said plastic pieces to once sink in said water, said first kind of said plastic pieces being then allowed to float on the surface of said water downstream of said agitating means while said second and third kinds of said plastic pieces are caused to move with said water and sink therein at said first and second stage portions of said vessel, respectively.

3. A plastic piece sorting apparatus according to claim 1, further including means for moving the plastic pieces to a first stage portion of the vessel through a flow passage provided on a downstream side of said air-bubble removing means, said flow passage being located entirely within said water and having no contact with air.

4. A method of sorting plastic pieces by specific gravity sorting, said plastic pieces having sizes suited to the specific gravity sorting and comprising those of at least first, second and third kinds, said first kind of plastic pieces having a specific gravity smaller than that of water, said second kind of plastic pieces having a specific gravity greater than that of water, said third kind of plastic pieces having a specific gravity greater than that of water but smaller than the specific gravity of said second kind of plastic pieces, said method including the steps of:

preparing a vessel containing an amount of water and having an inlet for plastic pieces to be sorted;

introducing plastic pieces to be sorted into said vessel through said inlet;

removing air bubbles from the plastic pieces introduced into the vessel; and moving said plastic pieces with said water in said vessel to allow said second kind of plastic pieces to sink in said water at a first stage portion of said vessel and allow said third kind of plastic pieces to sink in said water at a second stage portion of said vessel downstream of said first stage portion, said first kind of said plastic pieces floating on the surface of said water and being moved by the movement of said water to a third stage portion of said vessel downstream of said second stage portion.

5. A plastic piece sorting method according to claim 4, further including the steps of:

agitating the plastic pieces to be sorted to cause said plastic pieces to once sink in said water at a first point of said vessel upstream of said first stage portion:

allowing said first kind of said plastic pieces to float on the surface of said water at a second point downstream of said first point while said second and third kinds of said plastic pieces are caused to move with said water and sink therein at said first and second stage portions of said vessel, respectively.

6. A plastic piece sorting method according to claim 4, wherein the step of removing air bubbles from the plastic pieces is effected by agitating the plastic pieces within the water contained in the vessel.

7. A plastic piece sorting method according to claim 4, further including the step of moving the plastic pieces to a first stage portion of the vessel through a flow passage provided on a downstream side of a portion where the air bubbles are removed from the plastic pieces, said flow passage being located entirely within said water and having contact with air.

* * * * *